(12) United States Patent
Yanni et al.

(10) Patent No.: US 12,174,295 B2
(45) Date of Patent: Dec. 24, 2024

(54) ACOUSTIC MULTIPATH CORRECTION

(71) Applicant: TDK Corporation, Tokyo (JP)

(72) Inventors: Mamdouh Yanni, Brentwood, CA (US); Xiaoyue Jiang, San Jose, CA (US); Peter George Hartwell, Menlo Park, CA (US)

(73) Assignee: TDK CORPORATION (JP)

( * ) Notice: Subject to any disclaimer, the term of this patent is extended or adjusted under 35 U.S.C. 154(b) by 29 days.

(21) Appl. No.: 17/396,470

(22) Filed: Aug. 6, 2021

(65) Prior Publication Data

US 2022/0043144 A1 Feb. 10, 2022

Related U.S. Application Data

(60) Provisional application No. 63/063,159, filed on Aug. 7, 2020.

(51) Int. Cl.
*G01S 15/89* (2006.01)
*G06V 40/13* (2022.01)

(52) U.S. Cl.
CPC ...... *G01S 15/8915* (2013.01); *G06V 40/1306* (2022.01)

(58) Field of Classification Search
CPC .................. G01S 15/8915; G06V 40/1306
See application file for complete search history.

(56) References Cited

U.S. PATENT DOCUMENTS 4,880,012 A  11/1989  Sato
5,575,286 A  11/1996  Weng et al.
(Continued)

FOREIGN PATENT DOCUMENTS

CN     1826631 A    8/2006
CN   101192644 A    6/2008
(Continued)

OTHER PUBLICATIONS

ISA/EP, International Search Report and Written Opinion for International Application No. PCT/US2019061516, 14 pages, Mar. 12, 2020.

(Continued)

*Primary Examiner* — Isam A Alsomiri
*Assistant Examiner* — Abdallah Abulaban

(57) ABSTRACT

In a method for multipath reflection correction of acoustic signals received at an ultrasonic sensor, acoustic signals are received at the ultrasonic sensor over a time of flight range. Characteristics of multipath reflection signals of received acoustic signals are determined, wherein the characteristics of the multipath reflection signals of the received acoustic signals comprise a relationship of primary signal contributions to multipath reflection signal contributions for the acoustic signals received at the ultrasonic sensor at a plurality of times of flight for a plurality of locations of the ultrasonic sensor. The characteristics of the multipath reflection signals of received acoustic signals are compared to the received acoustic signals. The primary signal contribution and the multipath reflection signal contribution of the received acoustic signals is determined at a plurality of times of flight of the time range based on the characteristics of the multipath reflection signals of received acoustic signals.

19 Claims, 10 Drawing Sheets

(56) References Cited

U.S. PATENT DOCUMENTS

| | | |
|---|---|---|
| 5,680,863 A | 10/1997 | Hossack et al. |
| 5,684,243 A | 11/1997 | Gururaja et al. |
| 5,808,967 A | 9/1998 | Yu et al. |
| 5,867,302 A | 2/1999 | Fleming |
| 5,911,692 A | 6/1999 | Hussain et al. |
| 6,071,239 A | 6/2000 | Cribbs et al. |
| 6,104,673 A | 8/2000 | Cole et al. |
| 6,289,112 B1 | 9/2001 | Jain et al. |
| 6,292,576 B1 | 9/2001 | Brownlee |
| 6,296,610 B1 * | 10/2001 | Schneider ............ A61B 5/1172 600/445 |
| 6,350,652 B1 | 2/2002 | Libera et al. |
| 6,428,477 B1 | 8/2002 | Mason |
| 6,483,932 B1 | 11/2002 | Martinez et al. |
| 6,500,120 B1 | 12/2002 | Anthony |
| 6,676,602 B1 | 1/2004 | Barnes et al. |
| 6,679,844 B2 | 1/2004 | Loftman et al. |
| 6,736,779 B1 | 5/2004 | Sano et al. |
| 7,067,962 B2 | 6/2006 | Scott |
| 7,109,642 B2 | 9/2006 | Scott |
| 7,243,547 B2 | 7/2007 | Cobianu et al. |
| 7,257,241 B2 | 8/2007 | Lo |
| 7,400,750 B2 | 7/2008 | Nam |
| 7,433,034 B1 | 10/2008 | Huang |
| 7,459,836 B2 | 12/2008 | Scott |
| 7,471,034 B2 | 12/2008 | Schlote-Holubek et al. |
| 7,489,066 B2 | 2/2009 | Scott et al. |
| 7,634,117 B2 | 12/2009 | Cho |
| 7,665,763 B2 | 2/2010 | Bjoerklund et al. |
| 7,739,912 B2 | 6/2010 | Schneider et al. |
| 7,914,454 B2 | 3/2011 | Weber et al. |
| 8,018,010 B2 | 9/2011 | Tigli et al. |
| 8,139,827 B2 | 3/2012 | Schneider et al. |
| 8,255,698 B2 | 8/2012 | Li et al. |
| 8,311,514 B2 | 11/2012 | Bandyopadhyay et al. |
| 8,335,356 B2 | 12/2012 | Schmitt |
| 8,433,110 B2 | 4/2013 | Kropp et al. |
| 8,508,103 B2 | 8/2013 | Schmitt et al. |
| 8,515,135 B2 | 8/2013 | Clarke et al. |
| 8,666,126 B2 | 3/2014 | Lee et al. |
| 8,703,040 B2 | 4/2014 | Liufu et al. |
| 8,723,399 B2 | 5/2014 | Sammoura et al. |
| 8,805,031 B2 | 8/2014 | Schmitt |
| 9,056,082 B2 | 6/2015 | Liautaud et al. |
| 9,070,861 B2 | 6/2015 | Bibl et al. |
| 9,224,030 B2 | 12/2015 | Du et al. |
| 9,245,165 B2 | 1/2016 | Slaby et al. |
| 9,424,456 B1 | 8/2016 | Kamath Koteshwara et al. |
| 9,572,549 B2 | 2/2017 | Belevich et al. |
| 9,582,102 B2 | 2/2017 | Setlak |
| 9,582,705 B2 | 2/2017 | Du et al. |
| 9,607,203 B1 | 3/2017 | Yazdandoost et al. |
| 9,607,206 B2 | 3/2017 | Schmitt et al. |
| 9,613,246 B1 | 4/2017 | Gozzini et al. |
| 9,618,405 B2 | 4/2017 | Liu et al. |
| 9,665,763 B2 | 5/2017 | Du et al. |
| 9,747,488 B2 | 8/2017 | Yazdandoost et al. |
| 9,785,819 B1 | 10/2017 | Oreifej |
| 9,815,087 B2 | 11/2017 | Ganti et al. |
| 9,817,108 B2 | 11/2017 | Kuo et al. |
| 9,818,020 B2 | 11/2017 | Schuckers et al. |
| 9,881,195 B2 | 1/2018 | Lee et al. |
| 9,881,198 B2 | 1/2018 | Lee et al. |
| 9,898,640 B2 | 2/2018 | Ghavanini |
| 9,904,836 B2 | 2/2018 | Yeke Yazdandoost et al. |
| 9,909,225 B2 | 3/2018 | Lee et al. |
| 9,922,235 B2 | 3/2018 | Cho et al. |
| 9,933,319 B2 | 4/2018 | Li et al. |
| 9,934,371 B2 | 4/2018 | Hong et al. |
| 9,939,972 B2 | 4/2018 | Shepelev et al. |
| 9,953,205 B1 | 4/2018 | Rasmussen et al. |
| 9,959,444 B2 | 5/2018 | Young et al. |
| 9,967,100 B2 | 5/2018 | Hong et al. |
| 9,983,656 B2 | 5/2018 | Merrell et al. |
| 9,984,271 B1 | 5/2018 | King et al. |
| 10,006,824 B2 | 6/2018 | Tsai et al. |
| 10,080,544 B2 | 9/2018 | Chiang et al. |
| 10,275,638 B1 | 4/2019 | Yousefpor et al. |
| 10,315,222 B2 | 6/2019 | Salvia et al. |
| 10,322,929 B2 | 6/2019 | Soundara Pandian et al. |
| 10,325,915 B2 | 6/2019 | Salvia et al. |
| 10,387,704 B2 | 8/2019 | Dagan et al. |
| 10,445,547 B2 | 10/2019 | Tsai |
| 10,461,124 B2 | 10/2019 | Berger et al. |
| 10,478,858 B2 | 11/2019 | Lasiter et al. |
| 10,488,274 B2 | 11/2019 | Li et al. |
| 10,497,747 B2 | 12/2019 | Tsai et al. |
| 10,515,255 B2 | 12/2019 | Strohmann et al. |
| 10,539,539 B2 | 1/2020 | Garlepp et al. |
| 10,562,070 B2 | 2/2020 | Garlepp et al. |
| 10,600,403 B2 | 3/2020 | Garlepp et al. |
| 10,643,052 B2 | 5/2020 | Garlepp et al. |
| 10,656,255 B2 | 5/2020 | Ng et al. |
| 10,670,716 B2 | 6/2020 | Apte et al. |
| 10,706,835 B2 | 7/2020 | Garlepp et al. |
| 10,726,231 B2 | 7/2020 | Tsai et al. |
| 10,755,067 B2 | 8/2020 | De Foras et al. |
| 11,107,858 B2 | 8/2021 | Berger et al. |
| 11,112,388 B2 | 9/2021 | Garlepp et al. |
| 11,301,552 B2 | 4/2022 | Gurin et al. |
| 2001/0016686 A1 | 8/2001 | Okada et al. |
| 2001/0051772 A1 | 12/2001 | Bae |
| 2002/0062086 A1 | 5/2002 | Miele et al. |
| 2002/0135273 A1 | 9/2002 | Mauchamp et al. |
| 2003/0013955 A1 | 1/2003 | Poland |
| 2004/0059220 A1 | 3/2004 | Mourad et al. |
| 2004/0085858 A1 | 5/2004 | Khuri-Yakub et al. |
| 2004/0122316 A1 | 6/2004 | Satoh et al. |
| 2004/0174773 A1 | 9/2004 | Thomenius et al. |
| 2005/0023937 A1 | 2/2005 | Sashida et al. |
| 2005/0057284 A1 | 3/2005 | Wodnicki |
| 2005/0094490 A1 | 5/2005 | Thomenius et al. |
| 2005/0100200 A1 | 5/2005 | Abiko et al. |
| 2005/0110071 A1 | 5/2005 | Ema et al. |
| 2005/0146240 A1 | 7/2005 | Smith et al. |
| 2005/0148132 A1 | 7/2005 | Wodnicki et al. |
| 2005/0162040 A1 | 7/2005 | Robert |
| 2005/0228277 A1 | 10/2005 | Barnes et al. |
| 2006/0052697 A1 | 3/2006 | Hossack et al. |
| 2006/0079773 A1 | 4/2006 | Mourad et al. |
| 2006/0079777 A1 | 4/2006 | Karasawa |
| 2006/0210130 A1 | 9/2006 | Germond-Rouet et al. |
| 2006/0230605 A1 | 10/2006 | Schlote-Holubek et al. |
| 2006/0280346 A1 | 12/2006 | Machida |
| 2007/0016026 A1 | 1/2007 | Thomenius et al. |
| 2007/0046396 A1 | 3/2007 | Huang |
| 2007/0047785 A1 | 3/2007 | Jang et al. |
| 2007/0073135 A1 | 3/2007 | Lee et al. |
| 2007/0164632 A1 | 7/2007 | Adachi et al. |
| 2007/0202252 A1 | 8/2007 | Sasaki |
| 2007/0215964 A1 | 9/2007 | Khuri-Yakub et al. |
| 2007/0223791 A1 | 9/2007 | Shinzaki |
| 2007/0230754 A1 | 10/2007 | Jain et al. |
| 2008/0125660 A1 | 5/2008 | Yao et al. |
| 2008/0146938 A1 | 6/2008 | Hazard et al. |
| 2008/0150032 A1 | 6/2008 | Tanaka |
| 2008/0194053 A1 | 8/2008 | Huang |
| 2008/0240523 A1 | 10/2008 | Benkley et al. |
| 2009/0005684 A1 | 1/2009 | Kristoffersen et al. |
| 2009/0163805 A1 | 6/2009 | Sunagawa et al. |
| 2009/0171213 A1 | 7/2009 | Savord |
| 2009/0182237 A1 | 7/2009 | Angelsen et al. |
| 2009/0232367 A1 | 9/2009 | Shinzaki |
| 2009/0274343 A1 | 11/2009 | Clarke |
| 2009/0303838 A1 | 12/2009 | Svet |
| 2010/0030076 A1 | 2/2010 | Vortman et al. |
| 2010/0046810 A1 | 2/2010 | Yamada |
| 2010/0063391 A1 | 3/2010 | Kanai et al. |
| 2010/0113952 A1 | 5/2010 | Raguin et al. |
| 2010/0168583 A1 | 7/2010 | Dausch et al. |
| 2010/0195851 A1 | 8/2010 | Buccafusca |
| 2010/0201222 A1 | 8/2010 | Adachi et al. |
| 2010/0202254 A1 | 8/2010 | Roest et al. |
| 2010/0208004 A1 | 8/2010 | Ottosson et al. |

(56) References Cited

U.S. PATENT DOCUMENTS

| | | |
|---|---|---|
| 2010/0239751 A1 | 9/2010 | Regniere |
| 2010/0251824 A1 | 10/2010 | Schneider et al. |
| 2010/0256498 A1 | 10/2010 | Tanaka |
| 2010/0278008 A1 | 11/2010 | Ammar |
| 2011/0285244 A1 | 11/2011 | Lewis et al. |
| 2011/0291207 A1 | 12/2011 | Martin et al. |
| 2011/0319767 A1 | 12/2011 | Tsuruno |
| 2012/0016604 A1 | 1/2012 | Irving et al. |
| 2012/0092026 A1 | 4/2012 | Liautaud et al. |
| 2012/0095335 A1 | 4/2012 | Sverdlik et al. |
| 2012/0095344 A1 | 4/2012 | Kristoffersen et al. |
| 2012/0095347 A1 | 4/2012 | Adam et al. |
| 2012/0147698 A1 | 6/2012 | Wong et al. |
| 2012/0179044 A1 | 7/2012 | Chiang et al. |
| 2012/0224041 A1 | 9/2012 | Monden |
| 2012/0232396 A1 | 9/2012 | Tanabe |
| 2012/0238876 A1 | 9/2012 | Tanabe et al. |
| 2012/0263355 A1 | 10/2012 | Monden |
| 2012/0279865 A1 | 11/2012 | Regniere et al. |
| 2012/0288641 A1 | 11/2012 | Diatezua et al. |
| 2012/0300988 A1 | 11/2012 | Ivanov et al. |
| 2013/0051179 A1 | 2/2013 | Hong |
| 2013/0064043 A1 | 3/2013 | Degertekin et al. |
| 2013/0127297 A1 | 5/2013 | Bautista et al. |
| 2013/0127592 A1 | 5/2013 | Fyke et al. |
| 2013/0133428 A1 | 5/2013 | Lee et al. |
| 2013/0201134 A1 | 8/2013 | Schneider et al. |
| 2013/0271628 A1 | 10/2013 | Ku et al. |
| 2013/0294201 A1 | 11/2013 | Hajati |
| 2013/0294202 A1 | 11/2013 | Hajati |
| 2014/0003679 A1 | 1/2014 | Han et al. |
| 2014/0060196 A1 | 3/2014 | Falter et al. |
| 2014/0117812 A1 | 5/2014 | Hajati |
| 2014/0176332 A1 | 6/2014 | Alameh et al. |
| 2014/0208853 A1 | 7/2014 | Onishi et al. |
| 2014/0219521 A1 | 8/2014 | Schmitt et al. |
| 2014/0232241 A1 | 8/2014 | Hajati |
| 2014/0265721 A1 | 9/2014 | Robinson et al. |
| 2014/0294262 A1 | 10/2014 | Schuckers et al. |
| 2014/0313007 A1 | 10/2014 | Harding |
| 2014/0355387 A1 | 12/2014 | Kitchens et al. |
| 2015/0036065 A1 | 2/2015 | Yousefpor et al. |
| 2015/0049590 A1 | 2/2015 | Rowe et al. |
| 2015/0087991 A1 | 3/2015 | Chen et al. |
| 2015/0097468 A1 | 4/2015 | Hajati et al. |
| 2015/0105663 A1 | 4/2015 | Kiyose et al. |
| 2015/0127965 A1 | 5/2015 | Hong et al. |
| 2015/0145374 A1 | 5/2015 | Xu et al. |
| 2015/0164473 A1 | 6/2015 | Kim et al. |
| 2015/0165479 A1 | 6/2015 | Lasiter et al. |
| 2015/0169136 A1 | 6/2015 | Ganti et al. |
| 2015/0189136 A1 | 7/2015 | Chung et al. |
| 2015/0198699 A1 | 7/2015 | Kuo et al. |
| 2015/0206738 A1 | 7/2015 | Rastegar |
| 2015/0213180 A1 | 7/2015 | Herberholz |
| 2015/0220767 A1 | 8/2015 | Yoon et al. |
| 2015/0241393 A1 | 8/2015 | Ganti et al. |
| 2015/0261261 A1 | 9/2015 | Bhagavatula et al. |
| 2015/0286312 A1 | 10/2015 | Kang et al. |
| 2015/0301653 A1 | 10/2015 | Urushi |
| 2015/0324569 A1 | 11/2015 | Hong et al. |
| 2015/0345987 A1 | 12/2015 | Hajati |
| 2015/0357375 A1 | 12/2015 | Tsai et al. |
| 2015/0358740 A1 | 12/2015 | Tsai et al. |
| 2015/0362589 A1 | 12/2015 | Tsai |
| 2015/0371398 A1 | 12/2015 | Qiao et al. |
| 2016/0026840 A1 | 1/2016 | Li et al. |
| 2016/0041047 A1 | 2/2016 | Liu et al. |
| 2016/0051225 A1 | 2/2016 | Kim et al. |
| 2016/0063294 A1 | 3/2016 | Du et al. |
| 2016/0063300 A1 | 3/2016 | Du et al. |
| 2016/0070967 A1 | 3/2016 | Du et al. |
| 2016/0070968 A1 | 3/2016 | Gu et al. |
| 2016/0086010 A1 | 3/2016 | Merrell et al. |
| 2016/0091378 A1 | 3/2016 | Tsai et al. |
| 2016/0092715 A1 | 3/2016 | Yazdandoost et al. |
| 2016/0092716 A1 | 3/2016 | Yazdandoost et al. |
| 2016/0100822 A1 | 4/2016 | Kim et al. |
| 2016/0107194 A1 | 4/2016 | Panchawagh et al. |
| 2016/0117541 A1 | 4/2016 | Lu et al. |
| 2016/0180142 A1 | 6/2016 | Riddle et al. |
| 2016/0240768 A1 | 8/2016 | Fujii et al. |
| 2016/0296975 A1 | 10/2016 | Lukacs et al. |
| 2016/0299014 A1 | 10/2016 | Li et al. |
| 2016/0326477 A1 | 11/2016 | Fernandez-Alcon et al. |
| 2016/0345930 A1 | 12/2016 | Mizukami et al. |
| 2016/0350573 A1 | 12/2016 | Kitchens et al. |
| 2016/0358003 A1 | 12/2016 | Shen et al. |
| 2017/0004346 A1 | 1/2017 | Kim et al. |
| 2017/0004352 A1 | 1/2017 | Jonsson et al. |
| 2017/0330552 A1 | 1/2017 | Garlepp et al. |
| 2017/0032485 A1 | 2/2017 | Vemury |
| 2017/0059380 A1 | 3/2017 | Li et al. |
| 2017/0075700 A1 | 3/2017 | Abudi et al. |
| 2017/0076132 A1 | 3/2017 | Sezan et al. |
| 2017/0090024 A1 | 3/2017 | Kitchens et al. |
| 2017/0100091 A1 | 4/2017 | Eigil et al. |
| 2017/0110504 A1 | 4/2017 | Panchawagh et al. |
| 2017/0119343 A1 | 5/2017 | Pintoffl |
| 2017/0124374 A1 | 5/2017 | Rowe et al. |
| 2017/0168543 A1 | 6/2017 | Dai et al. |
| 2017/0185821 A1 | 6/2017 | Chen et al. |
| 2017/0194934 A1 | 7/2017 | Shelton et al. |
| 2017/0200054 A1 | 7/2017 | Du et al. |
| 2017/0219536 A1 | 8/2017 | Koch et al. |
| 2017/0231534 A1 | 8/2017 | Agassy et al. |
| 2017/0243049 A1 | 8/2017 | Dong |
| 2017/0255338 A1 | 9/2017 | Medina et al. |
| 2017/0293791 A1 | 10/2017 | Mainguet et al. |
| 2017/0316243 A1 | 11/2017 | Ghavanini |
| 2017/0316248 A1 | 11/2017 | He et al. |
| 2017/0322290 A1 | 11/2017 | Ng |
| 2017/0322291 A1 | 11/2017 | Salvia et al. |
| 2017/0322292 A1 | 11/2017 | Salvia et al. |
| 2017/0322305 A1 | 11/2017 | Apte et al. |
| 2017/0323133 A1 | 11/2017 | Tsai |
| 2017/0325081 A1 | 11/2017 | Chrisikos et al. |
| 2017/0326590 A1 | 11/2017 | Daneman |
| 2017/0326591 A1 | 11/2017 | Apte et al. |
| 2017/0326593 A1 | 11/2017 | Garlepp et al. |
| 2017/0326594 A1 | 11/2017 | Berger et al. |
| 2017/0328866 A1 | 11/2017 | Apte et al. |
| 2017/0328870 A1 | 11/2017 | Garlepp et al. |
| 2017/0330012 A1 | 11/2017 | Salvia et al. |
| 2017/0330553 A1 | 11/2017 | Garlepp et al. |
| 2017/0344782 A1 | 11/2017 | Andersson |
| 2017/0357839 A1 | 12/2017 | Yazdandoost et al. |
| 2017/0368574 A1 | 12/2017 | Sammoura et al. |
| 2018/0025202 A1 | 1/2018 | Ryshtun et al. |
| 2018/0032788 A1 | 2/2018 | Krenzer et al. |
| 2018/0069168 A1 | 3/2018 | Ikeuchi et al. |
| 2018/0101711 A1 | 4/2018 | D'Souza et al. |
| 2018/0107852 A1 | 4/2018 | Fenrich et al. |
| 2018/0107854 A1 | 4/2018 | Tsai et al. |
| 2018/0129849 A1 | 5/2018 | Strohmann et al. |
| 2018/0129857 A1 | 5/2018 | Bonev |
| 2018/0150679 A1 | 5/2018 | Kim et al. |
| 2018/0178251 A1 | 6/2018 | Foncellino et al. |
| 2018/0206820 A1 | 7/2018 | Anand et al. |
| 2018/0217008 A1 | 8/2018 | Li et al. |
| 2018/0225495 A1 | 8/2018 | Jonsson et al. |
| 2018/0229267 A1 | 8/2018 | Ono et al. |
| 2018/0268232 A1 | 9/2018 | Kim et al. |
| 2018/0276443 A1 | 9/2018 | Strohmann et al. |
| 2018/0276672 A1 | 9/2018 | Breed et al. |
| 2018/0329560 A1 | 11/2018 | Kim et al. |
| 2018/0341799 A1 | 11/2018 | Schwartz et al. |
| 2018/0349663 A1 | 12/2018 | Garlepp et al. |
| 2018/0357457 A1 | 12/2018 | Rasmussen et al. |
| 2018/0369866 A1 | 12/2018 | Sammoura et al. |
| 2018/0373913 A1 | 12/2018 | Panchawagh et al. |
| 2018/0376253 A1 | 12/2018 | Lutsky et al. |
| 2019/0005300 A1 | 1/2019 | Garlepp et al. |
| 2019/0012673 A1 | 1/2019 | Chakraborty et al. |

(56) References Cited

U.S. PATENT DOCUMENTS

| | | |
|---|---|---|
| 2019/0018123 A1 | 1/2019 | Narasimha-Iyer et al. |
| 2019/0043920 A1 | 2/2019 | Berger et al. |
| 2019/0046263 A1 | 2/2019 | Hayashida et al. |
| 2019/0057267 A1 | 2/2019 | Kitchens et al. |
| 2019/0073507 A1 | 3/2019 | D'Souza et al. |
| 2019/0087632 A1 | 3/2019 | Raguin et al. |
| 2019/0095015 A1 | 3/2019 | Han et al. |
| 2019/0102046 A1 | 4/2019 | Miranto et al. |
| 2019/0130083 A1 | 5/2019 | Agassy et al. |
| 2019/0148619 A1 | 5/2019 | Ikeuchi et al. |
| 2019/0171858 A1 | 6/2019 | Ataya et al. |
| 2019/0175035 A1 | 6/2019 | Van Der Horst et al. |
| 2019/0180069 A1 | 6/2019 | Akhbari et al. |
| 2019/0188441 A1 | 6/2019 | Hall et al. |
| 2019/0188442 A1 | 6/2019 | Flament et al. |
| 2019/0247887 A1 | 8/2019 | Salvia et al. |
| 2019/0262865 A1 | 8/2019 | Mehdizadeh et al. |
| 2019/0311177 A1 | 10/2019 | Joo et al. |
| 2019/0325185 A1* | 10/2019 | Tang ............... A61B 5/1172 |
| 2019/0340455 A1 | 11/2019 | Jung et al. |
| 2019/0354238 A1 | 11/2019 | Akhbari et al. |
| 2019/0370518 A1 | 12/2019 | Maor et al. |
| 2020/0030850 A1 | 1/2020 | Apte et al. |
| 2020/0050816 A1 | 2/2020 | Tsai |
| 2020/0050817 A1 | 2/2020 | Salvia et al. |
| 2020/0050820 A1 | 2/2020 | Iatsun et al. |
| 2020/0050828 A1 | 2/2020 | Li et al. |
| 2020/0074135 A1 | 3/2020 | Garlepp et al. |
| 2020/0111834 A1 | 4/2020 | Tsai et al. |
| 2020/0125710 A1 | 4/2020 | Andersson et al. |
| 2020/0147644 A1 | 5/2020 | Chang |
| 2020/0158694 A1 | 5/2020 | Garlepp et al. |
| 2020/0175143 A1 | 6/2020 | Lee et al. |
| 2020/0194495 A1 | 6/2020 | Berger et al. |
| 2020/0210666 A1 | 7/2020 | Flament |
| 2020/0250393 A1 | 8/2020 | Tsai et al. |
| 2020/0257875 A1 | 8/2020 | Hall et al. |
| 2020/0285882 A1 | 9/2020 | Skovgaard Christensen et al. |
| 2020/0302140 A1 | 9/2020 | Lu et al. |
| 2020/0342203 A1 | 10/2020 | Lin et al. |
| 2020/0355824 A1 | 11/2020 | Apte et al. |
| 2020/0400800 A1 | 12/2020 | Ng et al. |
| 2020/0410070 A1 | 12/2020 | Strohmann |
| 2020/0410193 A1 | 12/2020 | Wu |
| 2021/0015456 A1 | 1/2021 | Chiang et al. |
| 2021/0069748 A1 | 3/2021 | Bircumshaw et al. |
| 2021/0161503 A1 | 6/2021 | Mashood et al. |
| 2021/0177378 A1 | 6/2021 | Goericke et al. |
| 2022/0043144 A1 | 2/2022 | Yanni et al. |
| 2022/0262161 A1 | 8/2022 | Zhao et al. |

FOREIGN PATENT DOCUMENTS

| | | | |
|---|---|---|---|
| CN | 102159334 A | | 8/2011 |
| CN | 104415902 A | | 3/2015 |
| CN | 105264542 A | | 1/2016 |
| CN | 105378756 A | | 3/2016 |
| CN | 106458575 B | | 7/2018 |
| CN | 109196671 A | | 1/2019 |
| CN | 109255323 A | | 1/2019 |
| CN | 112241657 A | | 1/2021 |
| EP | 1214909 A1 | | 6/2002 |
| EP | 1768101 A1 | | 3/2007 |
| EP | 2884301 A1 | | 6/2015 |
| EP | 3086261 A2 | | 10/2016 |
| EP | 1534140 B1 | | 1/2019 |
| EP | 3292508 B1 | | 12/2020 |
| EP | 3757884 A1 | | 12/2020 |
| JP | 2011040467 A | | 2/2011 |
| JP | 2014183229 A | | 9/2014 |
| KR | 20200090355 | * | 7/2020 |
| KR | 20200090355 A | * | 7/2020 |
| TW | 201531701 A | | 8/2015 |
| WO | 2007018635 A1 | | 2/2007 |
| WO | 2009096576 A2 | | 8/2009 |
| WO | 2009137106 A2 | | 11/2009 |
| WO | 2014035564 A1 | | 3/2014 |
| WO | 2015009635 A1 | | 1/2015 |
| WO | 2015112453 A1 | | 7/2015 |
| WO | 2015120132 A1 | | 8/2015 |
| WO | 2015131083 A1 | | 9/2015 |
| WO | 2015134816 A1 | | 9/2015 |
| WO | 2015183945 A1 | | 12/2015 |
| WO | 2015193917 A2 | | 12/2015 |
| WO | 2016007250 A1 | | 1/2016 |
| WO | 2016011172 A1 | | 1/2016 |
| WO | 2016022439 A1 | | 2/2016 |
| WO | 2016040333 A2 | | 3/2016 |
| WO | 2016053587 A1 | | 4/2016 |
| WO | 2016061406 A1 | | 4/2016 |
| WO | 2016061410 A1 | | 4/2016 |
| WO | 2017003848 A1 | | 1/2017 |
| WO | 2017053877 A2 | | 3/2017 |
| WO | 2017192890 A1 | | 11/2017 |
| WO | 2017192895 A1 | | 11/2017 |
| WO | 2017192899 A1 | | 11/2017 |
| WO | 2017196678 A1 | | 11/2017 |
| WO | 2017196681 A1 | | 11/2017 |
| WO | 2017196682 A1 | | 11/2017 |
| WO | 2017192903 A3 | | 12/2017 |
| WO | 2018148332 A1 | | 8/2018 |
| WO | 2019005487 A1 | | 1/2019 |
| WO | 2019164721 A1 | | 8/2019 |
| WO | 2020081182 A1 | | 4/2020 |

OTHER PUBLICATIONS

ISA/EP, International Search Report and Written Opinion for International Application No. PCT/US2020/033854, 16 pages, Nov. 3, 2020.

ISA/EP, International Search Report and Written Opinion for International Application No. PCT/US2020/039208, 10 pages, Oct. 9, 2020.

ISA/EP, International Search Report and Written Opinion for International Application No. PCT/US2020/042427, 18 pages, Dec. 14, 2020.

ISA/EP, International Search Report and Written Opinion for International Application No. PCT/US2020/042428, 9 pages, Oct. 26, 2020.

ISA/EP, International Search Report and Written Opinion for International Application No. PCT/US2021/021412, 12 pages, Jun. 9, 2021.

ISA/EP, International Search Report and Written Opinion for International Application No. PCT/US2021/021561, 9 pages, Jun. 28, 2021.

ISA/EP, Partial Search Report and Provisional Opinion for International Application No. PCT/US2020/042427, 13 pages, Oct. 26, 2020.

Tang, et al., "11.2 3D Ultrasonic Fingerprint Sensor-on-a-Chip", 2016 IEEE International Solid-State Circuits Conference, IEEE, Jan. 31, 2016, 202-203.

Tang, et al., "Pulse-Echo Ultrasonic Fingerprint Sensor on a Chip", IEEE Transducers, Anchorage, Alaska, USA, Jun. 21-25, 2015, pp. 674-677.

ISA/EP, Partial International Search Report for International Application No. PCT/US2019/034032, 8 pages, Sep. 12, 2019, 8.

ISA/EP, International Search Report and Written Opinion for International Application # PCT/US2018/063431, pp. 1-15, mailed Feb. 5, 2019.

ISA/EP, International Search Report and Written Opinion for International Application # PCT/US2019/015020, pp. 1-23, mailed Jul. 1, 2019.

ISA/EP, International Search Report and Written Opinion for International Application # PCT/US2019/023440, pp. 1-10, mailed Jun. 4, 2019.

ISA/EP, International Search Report and Written Opinion for International Application No. PCT/US2017/031120, 12 pages, Aug. 29, 2017.

(56) References Cited

OTHER PUBLICATIONS

ISA/EP, International Search Report and Written Opinion for International Application No. PCT/US2017/031127, 13 pages, Sep. 1, 2017.
ISA/EP, International Search Report and Written Opinion for International Application No. PCT/US2017/031134, 12 pages, Aug. 30, 2017.
ISA/EP, International Search Report and Written Opinion for International Application No. PCT/US2017/031140, 18 pages, Nov. 2, 2017.
ISA/EP, International Search Report and Written Opinion for International Application No. PCT/US2017/031421 13 pages, Jun. 21, 2017.
ISA/EP, International Search Report and Written Opinion for International Application No. PCT/US2017/031426 13 pages, Jun. 22, 2017.
ISA/EP, International Search Report and Written Opinion for International Application No. PCT/US2017/031431, 14 pages, Aug. 1, 2017.
ISA/EP, International Search Report and Written Opinion for International Application No. PCT/US2017/031434, 13 pages, Jun. 26, 2017.
ISA/EP, International Search Report and Written Opinion for International Application No. PCT/US2017/031439, 10 pages, Jun. 20, 2017.
ISA/EP, International Search Report and Written Opinion for International Application No. PCT/US2017/031824, 18 pages, Sep. 22, 2017.
ISA/EP, International Search Report and Written Opinion for International Application No. PCT/US2017/031827, 16 pages, Aug. 1, 2017.
ISA/EP, International Search Report and Written Opinion for International Application No. PCT/US2017/031831, 12 pages, Jul. 21, 2017.
ISA/EP, International Search Report and Written Opinion for International Application No. PCT/US2018/037364, 10 pages, Sep. 3, 2018.
ISA/EP, International Search Report and Written Opinion for International Application No. PCT/US2020/039452, 11 pages, Sep. 9, 2020.
ISA/EP, International Search Report for International Application No. PCT/US2017/031826, 16 pages, Feb. 27, 2018.
ISA/EP, Partial International Search Report for International Application No. PCT/US2017/031140, 13 pages, Aug. 29, 2017.
ISA/EP, Partial International Search Report for International Application No. PCT/US2017/031823, 12 pages, Nov. 30, 2017.
ISA/EP, Partial Search Report for International Application No. PCT/US2020/033854, 10 pages, Sep. 8, 2020.
"Moving Average Filters", Waybackmachine XP05547422, Retrieved from the Internet: URL:https://web.archive.org/web/20170809081353/https//www.analog.com/media/en/technical-documentation/dsp-book/dsp_book_Ch15.pdf—[retrieved on Jan. 24, 2019], Aug. 9, 2017, 1-8.
Office Action for CN App No. 201780029016.7 mailed Mar. 24, 2020, 7 pages.
Office Action for CN App No. 201780029016.7 mailed Sep. 25, 2020, 7 pages.
Office Action for TW App No. 106113266 mailed Jun. 22, 2020, 23 pages.
"Receiver Thermal Noise Threshold", Fisher Telecommunication Services, Satellite Communications. Retrieved from the Internet: URL:https://web.archive.org/web/20171027075705/http//www.fishercom.xyz:80/satellite-communications/receiver-thermal-noise-threshold.html, Oct. 27, 2017, 3.
"Sleep Mode", Wikipedia, Retrieved from the Internet: URL:https://web.archive.org/web/20170908153323/https://en.wikipedia.org/wiki/Sleep_mode [retrieved on Jan. 25, 2019], Sep. 8, 2017, 1-3.
"TMS320C5515 Fingerprint Development Kit (FDK) Hardware Guide", Texas Instruments, Literature No. SPRUFX3, XP055547651, Apr. 2010, 1-26.

"ZTE V7 MAX. 5,5" smartphone on MediaTeck Helio P10 cpu; Published on Apr. 20, 2016; https://www.youtube.com/watch?v=ncNCbpkGQZU (Year: 2016).
Cappelli, et al., "Fingerprint Image Reconstruction from Standard Templates", IEEE Transactions on Pattern Analysis and Machine Intelligence, IEEE Computer Society, vol. 29, No. 9, Sep. 2007, 1489-1503.
Dausch, et al., "Theory and Operation of 2-D Array Piezoelectric Micromachined Ultrasound Transducers", IEEE Transactions on Ultrasonics, and Frequency Control, vol. 55, No. 11;, Nov. 2008, 2484-2492.
Feng, et al., "Fingerprint Reconstruction: From Minutiae to Phase", IEEE Transactions on Pattern Analysis and Machine Intelligence, IEEE Computer Society, vol. 33, No. 2, Feb. 2011, 209-223.
Hopcroft, et al., "Temperature Compensation of a MEMS Resonator Using Quality Factor as a Thermometer", Retrieved from Internet: http://micromachine.stanford.edu/~amanu/linked/MAH_MEMS2006.pdf, 2006, 222-225.
Hopcroft, et al., "Using the temperature dependence of resonator quality factor as a thermometer", Applied Physics Letters 91. Retrieved from Internet: http://micromachine.stanford.edu/~hopcroft/Publications/Hopcroft_QT_ApplPhysLett_91_013505.pdf, 2007, 013505-1-031505-3.
Jiang, et al., "Ultrasonic Fingerprint Sensor with Transmit Beamforming Based on a PMUT Array Bonded to CMOS Circuitry", IEEE Transactions on Ultrasonics Ferroelectrics and Frequency Control, Jan. 1, 2017, 1-9.
Kumar, et al., "Towards Contactless, Low-Cost and Accurate 3D Fingerprint Identification", IEEE Transactions on Pattern Analysis and Machine Intelligence, IEEE Computer Society, vol. 37, No. 3, Mar. 2015, 681-696.
Lee, et al., "Low jitter and temperature stable MEMS oscillators", Frequency Control Symposium (FCS), 2012 IEEE International, May 2012, 1-5.
Li, et al., "Capacitive micromachined ultrasonic transducer for ultra-low pressure measurement: Theoretical study", AIP Advances 5.12. Retrieved from Internet: http://scitation.aip.org/content/aip/journal/adva/5/12/10.1063/1.4939217, 2015, 127231.
Pang, et al., "Extracting Valley-Ridge Lines from Point-Cloud-Based 3D Fingerprint Models", IEEE Computer Graphics and Applications, IEEE Service Center, New York, vol. 33, No. 4, Jul./Aug. 2013, 73-81.
Papageorgiou, et al., "Self-Calibration of Ultrasonic Transducers in an Intelligent Data Acquisition System", International Scientific Journal of Computing, 2003, vol. 2, Issue 2 Retrieved Online: URL: https://scholar.google.com/scholar?q=self-calibration+of+ultrasonic+transducers+in+an+intelligent+data+acquisition+system&hl=en&as_sdt=0&as_vis=1&oi=scholart, 2003, 9-15.
Qiu, et al., "Piezoelectric Micromachined Ultrasound Transducer (PMUT) Arrays for Integrated Sensing, Actuation and Imaging", Sensors 15, doi:10.3390/s150408020, Apr. 3, 2015, 8020-8041.
Ross, et al., "From Template to Image: Reconstructing Fingerprints from Minutiae Points", IEEE Transactions on Pattern Analysis and Machine Intelligence, IEEE Computer Society, vol. 29, No. 4, Apr. 2007, 544-560.
Rozen, et al., "Air-Coupled Aluminum Nitride Piezoelectric Micromachined Ultrasonic Transducers at 0.3 MHZ To 0.9 MHZ", 2015 28th IEEE International Conference on Micro Electro Mechanical Systems (MEMS), IEEE, Jan. 18, 2015, 921-924.
Savoia, et al., "Design and Fabrication of a cMUT Probe for Ultrasound Imaging of Fingerprints", 2010 IEEE International Ultrasonics Symposium Proceedings, Oct. 2010, 1877-1880.
Shen, et al., "Anisotropic Complementary Acoustic Metamaterial for Canceling out Aberrating Layers", American Physical Society, Physical Review X 4.4: 041033., Nov. 19, 2014, 041033-1-041033-7.
Thakar, et al., "Multi-resonator approach to eliminating the temperature dependence of silicon-based timing references", Hilton Head'14. Retrieved from the Internet: http://blog.narotama.ac.id/wp-content/uploads/2014/12/Multi-resonator-approach-to-eliminating-the-temperature-dependance-of-silicon-based-timing-references.pdf, 2014, 415-418.

(56) References Cited

OTHER PUBLICATIONS

Zhou, et al., "Partial Fingerprint Reconstruction with Improved Smooth Extension", Network and System Security, Springer Berlin Heidelberg, Jun. 3, 2013, 756-762.
EP Office Action, for Application 17724184.1, mailed Oct. 12, 2021, 6 pages.
EP Office Action, for Application 17725017.2 mailed Feb. 25, 2022, 7 pages.
EP Office Action, mailed Oct. 9, 2021, 6 pages.
European Patent Office, Office Action, App 17725018, pp. 5, Oct. 25, 2021.
European Patent Office, Office Action, App 17725020.6, pp. 4, Oct. 25, 2021.
Office Action for CN App No. 201780028685.2 mailed Dec. 5, 2022, 11 pages.
Office Action for CN App No. 201780027434.2 mailed Oct. 21, 2022, 10 pages.
Office Action for CN App No. 201780027435.7 mailed Sep. 9, 2022, 9 pages.
Office Action for CN App No. 201780027444.6 mailed Dec. 2, 2022, 17 pages.
Office Action for CN App No. 201780029058.0 mailed Dec. 2, 2022, 9 pages.
Office Action for CN App No. 201780029059.5 mailed Nov. 11, 2022, 11 pages.
Office Action for CN App No. 2020800377355 mailed Aug. 3, 2022, 8 pages.
Taiwan Application No. 106114623, 1st Office Action, Dated Aug. 5, 2021, pp. 1-8.
Tang, et al., "Pulse-echo ultrasonic fingerprint sensor on a chip", 2015 Transducers, 2015 18th International Conference on Solid-State Sensors, Actuators and Microsystems, Apr. 1, 2015, 674-677.
ISA/EP, International Search Report and Written Opinion for International Application No. PCT/US2022/075468, 28 pages, Jan. 16, 2023.

* cited by examiner

ACOUSTIC MULTIPATH CORRECTION

RELATED APPLICATIONS

This application claims priority to and the benefit of U.S. Patent Provisional Patent Application 63/063,159, filed on Aug. 7, 2020, entitled "ULTRASONIC SENSOR WITH ACOUSTIC MULTIPATH CORRECTION," by Yanni et al., and assigned to the assignee of the present application, which is incorporated herein by reference in its entirety.

BACKGROUND

Ultrasonic fingerprint sensors operate by transmitting ultrasonic signals onto a finger and imaging a fingerprint using the reflected ultrasonic signals. Transmitting ultrasonic signals also causes multipath signals other than the desired ultrasonic signals that reflect off the target finger. These multipath signals result in noise on the fingerprint image, and can be caused by a number of sources, e.g., reflections on the back of a substrate, reflections within the layers of the ultrasonic sensor stack, etc. In order to provide a high quality fingerprint image that is useful for user authentication, it is desired to reduce the impact of multipath reflections.

BRIEF DESCRIPTION OF THE DRAWINGS

The accompanying drawings, which are incorporated in and form a part of the Description of Embodiments, illustrate various non-limiting and non-exhaustive embodiments of the subject matter and, together with the Description of Embodiments, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DESCRIPTION OF EMBODIMENTS

Figure 1:
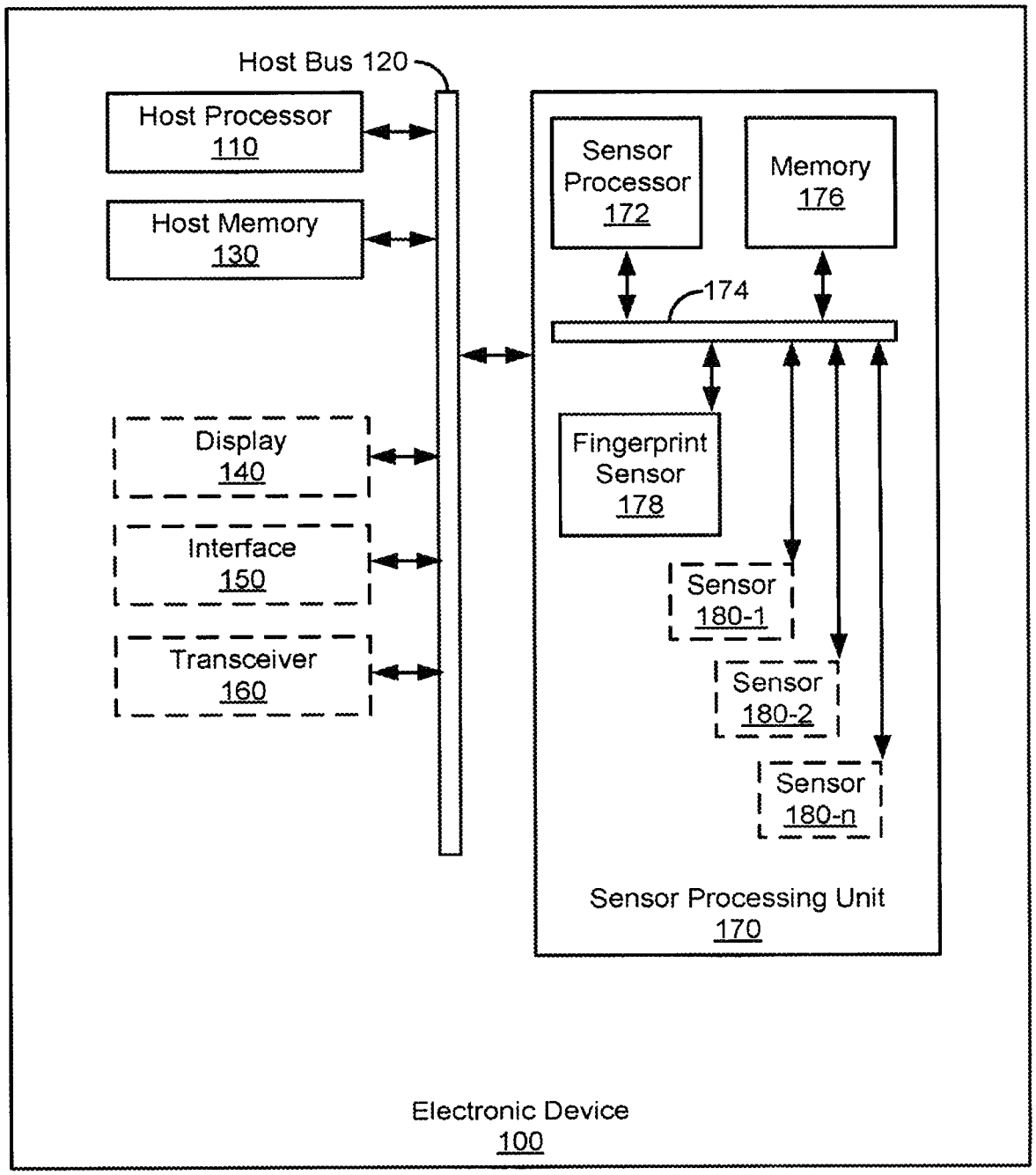
FIG. 1 is a block diagram of an example electronic device 100 upon which embodiments described herein may be implemented.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of acoustic (e.g., ultrasonic) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "accessing," "receiving," "determining," "comparing," "generating," "providing," "combining," "analyzing," "identifying," "displaying," "presenting," "using," "completing," "executing," "removing," "correcting," or the like, refer to the actions and processes of an electronic device such as an electrical device.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of a device including a fingerprint sensor, upon which described embodiments can be implemented. An example system for multipath reflection correction of acoustic signals received at an ultrasonic sensor based on multipath characteristics of the acoustic signals is then described, in accordance with various embodiments. Example operations of a system for multipath reflection correction of acoustic signals received at an ultrasonic sensor are then described.

Ultrasonic fingerprint sensor can be used to capture the fingerprint of a user's finger. The ultrasonic fingerprint sensor may capture ultrasonic waves reflected of the outermost layers of the finger. An ultrasonic sensor may be made of several layers, e.g., the substrate layer, the ultrasonic transducer layer and an acoustic coupling layer. The ultrasonic waves can reflect from any interface in the sensor stack and finally be detected by the ultrasonic transducers. The signals may have been reflected multiple times and therefore are detected with a slight delay due to the longer path travelled. These type of reflections are referred to as multipath reflections or multipath signals. The problem with multipath reflections is that multipath reflections can interfere with direct signals, e.g., acoustic signals reflecting from deeper layers of a finger. The direct signals from deeper layers in the finger travel longer through the finger and thus have an increased time-of-flight (TOF), and therefore can interfere with multipath reflections from shallower layer that also take longer to arrive at the transducer due to the longer path in the sensor stack causes by the multipath reflections. More general, any multipath reflection from a first layers can interfere with the detections of direct signals from a second deeper layer.

To ascertain more accurate imaging of the deeper layers of the skin, independent of the upper clearer skin layers, certain digital signal processing algorithms need to be deployed to facilitate this process. This algorithmic process is conducted, starting with the utilization of the initial (shallow) skin layer, eliminate all replicas existent of the same profile in the deeper layers. In other words, the multipath reflections of a first shallow layer should be cancelled or reduced for a proper detection and imaging of one or more deeper layers.

Once this process is complete, e.g., by eliminating the first skin layer from the rest of the ultrasound reflections, this first skin layer is remembered. An evaluation is made to see what is the next skin layer that survived the above elimination process, and the above process is repeated. Hence, it is a process of "peeling an onion" whereby deeper and deeper different layers of the skin are extracted removing all superposition of the shallower skin layers and hence ending with clearer deeper skin ultrasound imaging. In accordance with embodiments, the correction for the multipath reflection signals is an iterative process, cancelling the multipath reflection from a first layer, revealing the correct signals from the deeper residual layers, and then once the multipath reflection from the second layer is completed, the correct signals from an even deeper third layer are revealed, and so on.

Embodiments described herein provide systems and methods for multipath correction using characteristics of the multipath reflection signals of the received acoustic signals. For example, during image capture, acoustic signals are generated and received at the ultrasonic sensor over a time of flight range, where the acoustic signals include a primary signal contribution and a multipath reflection signal contribution. Multipath characteristics of the received acoustic signals are determined, where the multipath characteristics include a relationship of primary signal contributions to multipath reflection signal contributions for the acoustic signals received at the ultrasonic sensor at a plurality of times of flight for a plurality of locations of the ultrasonic sensor. In some embodiments, the multipath characteristics are based on correlations within the received acoustic signals identifying the multipath reflection signal contributions of the received acoustic signals. In other words, the multipath characteristics define the multipath signal reflections contributions to the received acoustics signals based on identified correlations within the received acoustic signals. Using these multipath characteristics of acoustic signals, the received acoustic signals can be analyzed, identifying the primary signal contributions and the multipath signal contributions, allowing for the identification of the primary signals of the received acoustic signals for multiple times of flight (e.g., for multiple tissue depths).

Embodiments described herein provide a method for multipath reflection correction of acoustic signals received at an ultrasonic sensor. Acoustic signals are received at the ultrasonic sensor over a time of flight range, wherein the acoustic signals comprise a primary signal contribution and a multipath reflection signal contribution. Characteristics of multipath reflection signals of received acoustic signals are determined, wherein the characteristics of the multipath reflection signals of the received acoustic signals comprise a relationship of primary signal contributions to multipath reflection signal contributions for the acoustic signals received at the ultrasonic sensor at a plurality of times of flight for a plurality of locations of the ultrasonic sensor. In some embodiments, the characteristics of the multipath reflection signals of received acoustic signals are based on correlations within the received acoustic signals identifying the multipath reflection signal contributions of the received acoustic signals. The characteristics of the multipath reflection signals of received acoustic signals are compared to the received acoustic signals. The primary signal contribution of the received acoustic signals is determined at a plurality of times of flight of the time range based on the characteristics of the multipath reflection signals of received acoustic signals.

In some embodiments, determining the characteristics of the multipath reflection signals of received acoustic signals includes comparing the received acoustic signals at the plurality of times of flight for the plurality of locations. Based on the comparing, the correlations to identify the multipath reflection signal contributions of the received acoustic signals at the plurality of times of flight for the plurality of locations are determined, wherein the correlations are the characteristics of the multipath reflection signals. In one embodiment, a reference signal based on the correlations identifying the multipath reflection signal contributions of the received acoustic signals is generated, wherein the characteristics of the multipath reflection signals of received acoustic signals comprise the reference signal.

In some embodiments, the comparing the characteristics of the multipath reflection signals of received acoustic signals to the received acoustic signals includes comparing the reference signal to the received acoustic signals at the plurality of times of flight. Based on the comparing the reference signal to the received acoustic signals at the plurality of times of flight, portions of the received acoustic signals that are representative of the reference signal are identified, wherein the portions of the received acoustic signals that are representative of the reference signal comprise the multipath reflection signal contributions of the received acoustic signals.

In some embodiments, the determining the primary signal contribution of the received acoustic signals at the plurality of times of flight of the time range based on the characteristics of the multipath reflection signals of received acoustic signals includes removing the portions of the received acoustic signals that are representative of the reference signal from the acoustic signals based on the comparing the reference signal to the received acoustic signals, wherein remaining acoustic signals comprises a first primary signal contribution.

Example Mobile Electronic Device

Turning now to the figures, FIG. 1 is a block diagram of an example electronic device 100. As will be appreciated, electronic device 100 may be implemented as a device or apparatus, such as a handheld mobile electronic device. For example, such a mobile electronic device may be, without limitation, a mobile telephone phone (e.g., smartphone, cellular phone, a cordless phone running on a local network, or any other cordless telephone handset), a wired telephone (e.g., a phone attached by a wire), a personal digital assistant (PDA), a video game player, video game controller, a Head Mounted Display (HMD), a virtual or augmented reality device, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, or a combination of one or more of these devices. In other embodiments, electronic device 100 may be implemented as a fixed electronic device, such as and without limitation, an electronic lock, a doorknob, a car start button, an automated teller machine (ATM), etc. In accordance with various embodiments, electronic device 100 is capable of reading fingerprints.

As depicted in FIG. 1, electronic device 100 may include a host processor 110, a host bus 120, a host memory 130, and a sensor processing unit 170. Some embodiments of electronic device 100 may further include one or more of a display device 140, an interface 150, a transceiver 160 (all depicted in dashed lines) and/or other components. In various embodiments, electrical power for electronic device 100 is provided by a mobile power source such as a battery (not shown), when not being actively charged.

Host processor 110 can be one or more microprocessors, central processing units (CPUs), DSPs, general purpose microprocessors, ASICs, ASIPs, FPGAs or other processors which run software programs or applications, which may be stored in host memory 130, associated with the functions and capabilities of electronic device 100.

Host bus 120 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, host processor 110, host memory 130, display 140, interface 150, transceiver 160, sensor processing unit (SPU) 170, and other components of electronic device 100 may be coupled communicatively through host bus 120 in order to exchange commands and data. Depending on the architecture, different bus configurations may be employed as desired. For example, additional buses may be used to couple the various components of electronic device 100, such as by using a dedicated bus between host processor 110 and memory 130.

Host memory 130 can be any suitable type of memory, including but not limited to electronic memory (e.g., read only memory (ROM), random access memory, or other electronic memory), hard disk, optical disk, or some combination thereof. Multiple layers of software can be stored in host memory 130 for use with/operation upon host processor 110. For example, an operating system layer can be provided for electronic device 100 to control and manage system resources in real time, enable functions of application software and other layers, and interface application programs with other software and functions of electronic device 100. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single electronic device 100, and in some of those embodiments, multiple applications can run simultaneously as part of the user experience system. In some embodiments, the user experience system, operating system, and/or the host processor 110 may operate in a low-power mode (e.g., a sleep mode) where very few instructions are processed. Such a low-power mode may utilize only a small fraction of the processing power of a full-power mode (e.g., an awake mode) of the host processor 110.

Display 140, when included, may be a liquid crystal device, (organic) light emitting diode device, or other display device suitable for creating and visibly depicting graphic images and/or alphanumeric characters recognizable to a user. Display 140 may be configured to output images viewable by the user and may additionally or alternatively function as a viewfinder for camera. It should be appreciated that display 140 is optional, as various electronic devices, such as electronic locks, doorknobs, car start buttons, etc., may not require a display device.

Interface 150, when included, can be any of a variety of different devices providing input and/or output to a user, such as audio speakers, touch screen, real or virtual buttons, joystick, slider, knob, printer, scanner, computer network I/O device, other connected peripherals and the like.

Transceiver 160, when included, may be one or more of a wired or wireless transceiver which facilitates receipt of data at electronic device 100 from an external transmission source and transmission of data from electronic device 100 to an external recipient. By way of example, and not of limitation, in various embodiments, transceiver 160 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Electronic device 100 also includes a general purpose sensor assembly in the form of integrated Sensor Processing Unit (SPU) 170 which includes sensor processor 172, memory 176, a fingerprint sensor 178, and a bus 174 for facilitating communication between these and other components of SPU 170. In some embodiments, SPU 170 may include at least one additional sensor 180 (shown as sensor 180-1, 180-2, . . . 180-n) communicatively coupled to bus 174. In some embodiments, at least one additional sensor 180 is a force or pressure sensor (e.g., a touch sensor) configured to determine a force or pressure or a temperature sensor configured to determine a temperature at electronic device 100. The force or pressure sensor may be disposed within, under, or adjacent fingerprint sensor 178. In some embodiments, all of the components illustrated in SPU 170 may be embodied on a single integrated circuit. It should be appreciated that SPU 170 may be manufactured as a standalone unit (e.g., an integrated circuit), that may exist separately from a larger electronic device and is coupled to host bus 120 through an interface (not shown). It should be appreciated that, in accordance with some embodiments, that SPU 170 can operate independent of host processor 110 and host memory 130 using sensor processor 172 and memory 176.

Sensor processor 172 can be one or more microprocessors, CPUs, DSPs, general purpose microprocessors, ASICs, ASIPs, FPGAs or other processors which run software programs, which may be stored in memory 176, associated with the functions of SPU 170. It should also be appreciated that fingerprint sensor 178 and additional sensor 180, when included, may also utilize processing and memory provided by other components of electronic device 100, e.g., host processor 110 and host memory 130.

Bus 174 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. In the embodiment shown, sensor processor 172, memory 176, fingerprint sensor 178, and other components of SPU 170 may be communicatively coupled through bus 174 in order to exchange data.

Memory 176 can be any suitable type of memory, including but not limited to electronic memory (e.g., read only memory (ROM), random access memory, or other electronic memory). Memory 176 may store algorithms or routines or other instructions for processing data received from fingerprint sensor 178 and/or one or more sensor 180, as well as the received data either in its raw form or after some processing. Such algorithms and routines may be implemented by sensor processor 172 and/or by logic or processing capabilities included in fingerprint sensor 178 and/or sensor 180.

A sensor 180 may comprise, without limitation: a temperature sensor, a humidity sensor, an atmospheric pressure sensor, an infrared sensor, a radio frequency sensor, a navigation satellite system sensor (such as a global positioning system receiver), an acoustic sensor (e.g., a microphone), an inertial or motion sensor (e.g., a gyroscope, accelerometer, or magnetometer) for measuring the orientation or motion of the sensor in space, or other type of sensor for measuring other physical or environmental factors. In one example, sensor 180-1 may comprise an acoustic sensor, sensor 180-2 may comprise a temperature sensor, and sensor 180-$n$ may comprise a motion sensor.

In some embodiments, fingerprint sensor 178 and/or one or more sensors 180 may be implemented using a microelectromechanical system (MEMS) that is integrated with sensor processor 172 and one or more other components of SPU 170 in a single chip or package. It should be appreciated that fingerprint sensor 178 may be disposed behind display 140. Although depicted as being included within SPU 170, one, some, or all of fingerprint sensor 178 and/or one or more sensors 180 may be disposed externally to SPU 170 in various embodiments. It should be appreciated that fingerprint sensor 178 can be any type of fingerprint sensor, including without limitation, an ultrasonic sensor, an optical sensor, a camera, etc.

Figure 2:
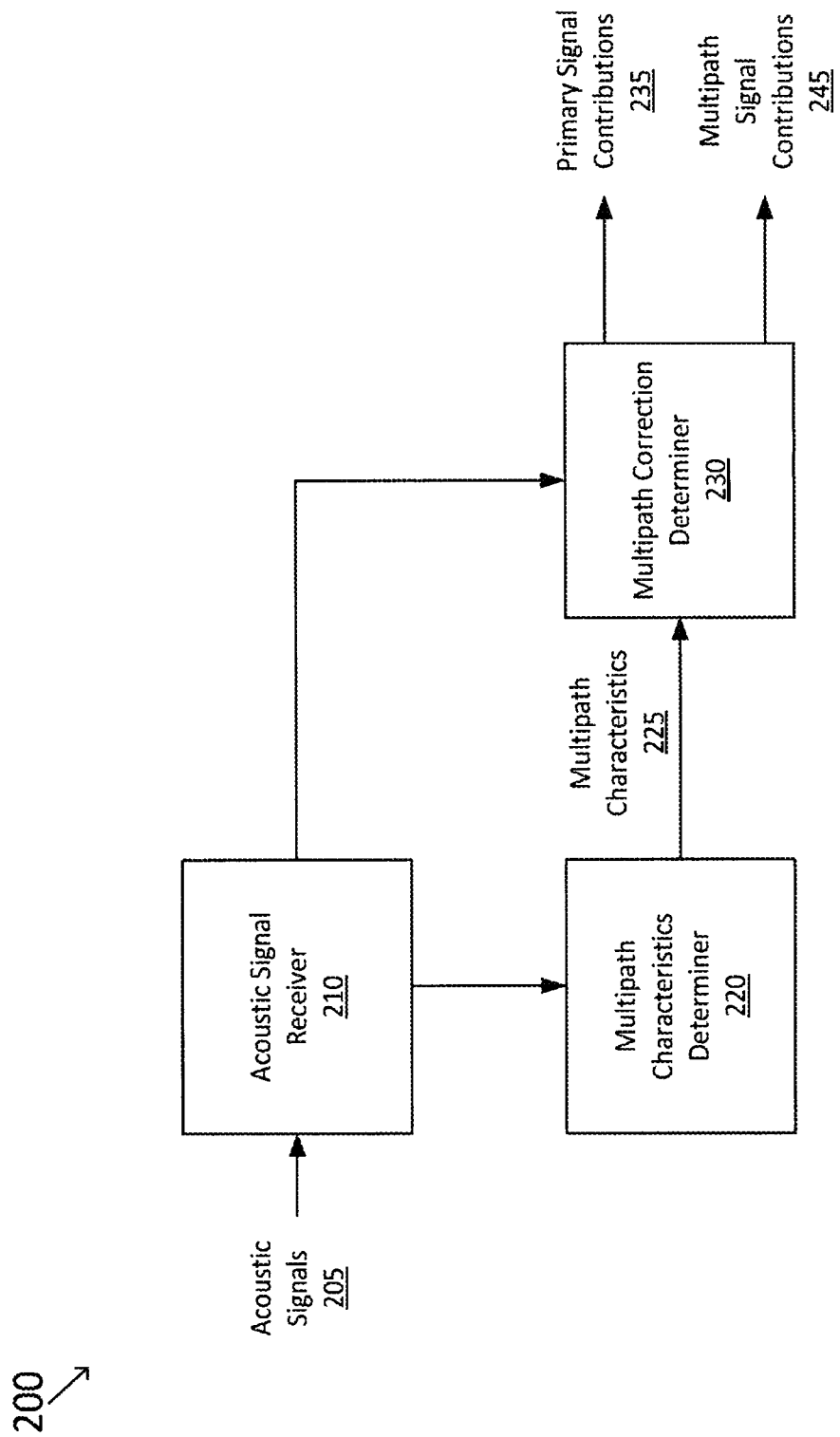
FIG. 2 illustrates a block diagram of an example multipath correction system for performing multipath reflection correction of acoustic signals received at an ultrasonic sensor, according to some embodiments.

Example Multipath Correction System for Performing Multipath Reflection Correction of Acoustic Signals Received at an Ultrasonic Sensor FIG. 2 illustrates a block diagram of an example multipath correction system 200 for performing multipath reflection correction of acoustic signals received at an ultrasonic sensor, according to some embodiments. Multipath correction system 200 is configured to correct for multipath signal contributions to acoustic signals received at an ultrasonic sensor, according to various embodiments. It should be appreciated that multipath correction system 200 can be implemented as hardware, software, or any combination thereof. It should also be appreciated that acoustic signal receiver 210, multipath characteristics determiner 220, and multipath correction determiner 230 may be separate components, may be comprised within a single component, or may be comprised in various combinations of multiple components (e.g., multipath characteristics determiner 220 and multipath correction determiner 230 may be comprised within a single component), in accordance with some embodiments. Multipath characteristics determiner 220 is described in detail at FIG. 3A and multipath correction determiner 230 is described in detail at FIG. 3B, according to some embodiments.

Acoustic signal receiver 210 is configured to receive acoustic signals 205 from an ultrasonic sensor (e.g., during fingerprint image capture). The ultrasonic sensor (e.g., ultrasonic fingerprint sensor) is operable to emit and detect acoustic signals (also referred to as ultrasonic signals or ultrasound signals). An array of ultrasonic transducers (e.g., Piezoelectric Micromachined Ultrasonic Transducers (PMUTs)) may be used to transmit and receive the ultrasonic waves, where the ultrasonic transducers of the array are capable of performing both the transmission and receipt of the ultrasonic waves. The emitted ultrasonic waves are reflected from any objects in contact with (or in front of) the fingerprint sensor, and these reflected ultrasonic waves, or echoes, are then detected. Where the object is a finger, the waves are reflected from different features of the finger, such as the surface features on the skin, fingerprint, or features present in deeper layers of the finger (e.g., the dermis). Examples of surface features of a finger are ridges and valleys of a fingerprint, e.g., the ridge/valley pattern of the finger. For example, the reflection of the sound waves from the ridge/valley pattern enables the fingerprint sensor to produce a fingerprint image that may be used for identification of the user.

In accordance with some embodiments, acoustic signals 205 are captured at an ultrasonic sensor at multiple different times of flight. It should be appreciated that operating parameters of an ultrasonic fingerprint sensor can be controlled, allowing for image capture at different times of flight. For instance, an adjustment of timing of transmission of the ultrasonic signals for ultrasonic transducers of an ultrasonic fingerprint sensor can change the time of flight.

Multipath characteristics determiner 220 is configured to determine multipath characteristics 225 for the received acoustic signals 205. In accordance with the described embodiments, the multipath characteristics 225 are determined based on the received acoustic signal 205. For example, the multipath characteristics 225 are determined based on correlations within the received acoustic signals 205 identifying the multipath reflection signal contributions 245 of the received acoustic signals 205. The multipath characteristics 225 include a relationship of primary signal contributions to multipath reflection signal contributions for acoustic signals 205 received at the ultrasonic sensor at a plurality of times of flight for a plurality of locations of the ultrasonic sensor.

In accordance with the described embodiments, acoustics signals 205 are received at multipath characteristics determiner 220 from acoustic signal receiver 210. It should be appreciated that multipath correction system 200 is similar to acoustic multipath canceller (AMC) 700 of FIG. 7. The initial skin layer is determined and identified at multipath characteristics determiner 220 as multipath characteristics 225 (e.g., reference input x(n) of AMC 700) to remove the initial skin layer from acoustic signals 205 (e.g., primary input d(n) of AMC 700), thus revealing deeper skin layers.

Figure 4:
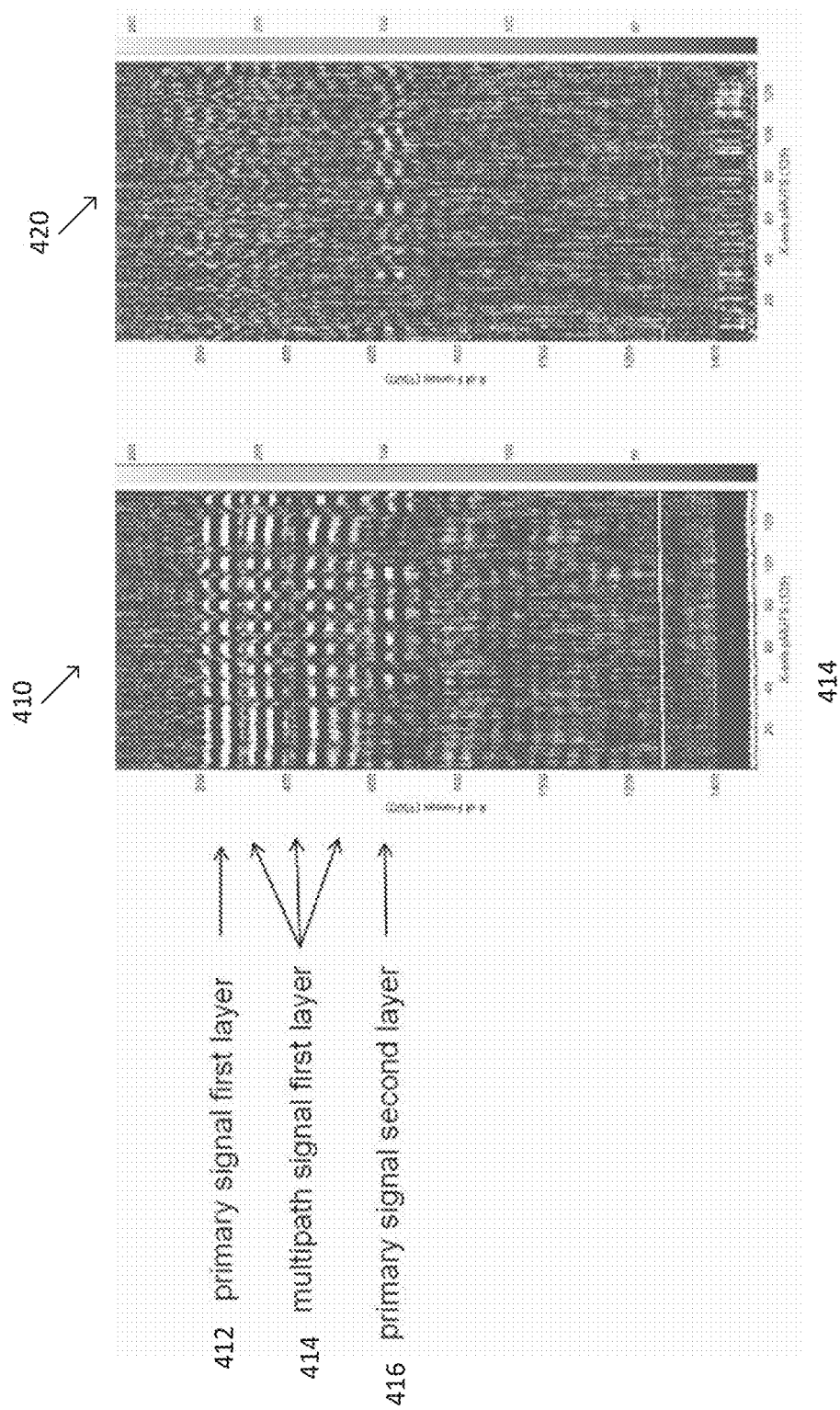
FIG. 4 shows example plots of acoustic signal amplitude for a two-dimensional array of ultrasonic transducers, according to embodiments.

FIG. 4 shows example plots of acoustic signal amplitude for a two-dimensional array of ultrasonic transducers, according to embodiments. Plot 410 shows an example plot of acoustic signal for a two-dimensional array of ultrasonic transducers before acoustic multipath correction is applied. As illustrated, the horizontal x-axis shows a line of 135 transducers and the vertical axis is a time axis indicating the time of flight (TOF) in nanoseconds (ns). As such, the top of plot 410 shows the shallow layers of the target, and going down represents going deeper in the target. In the illustrated embodiment, this target is a phantom line structures resulting in the periodic signal going from left through right along the x-axis. As illustrated, the signals around 200-250 ns represent the primary signal 412 from the first layer of the target. The signals from 250-600 ns represent the multipath signal 414 from the first layer of the target. The signals around 600-650 ns represent the primary signal 416 from the second layer of the target, but there is interference from the multipath signal from the first layer of the target.

Plot 420 shows an example plot of acoustic signal for a two-dimensional array of ultrasonic transducers after acoustic multipath correction is applied. After obtaining the signal and image information from the first layer (e.g., using example multipath correction system 200 of FIG. 2), the acoustic multipath correction is used to remove the contributions from the first layer to determine the signal contribution only due to the deeper second layer, which has a much lower amplitude. Plot 420 shows the signal of plot 410 after the acoustic multipath correction, where all signal from the first layer (e.g., primary signal 412 and multipath signal 414) has been removed.

Figure 3A:
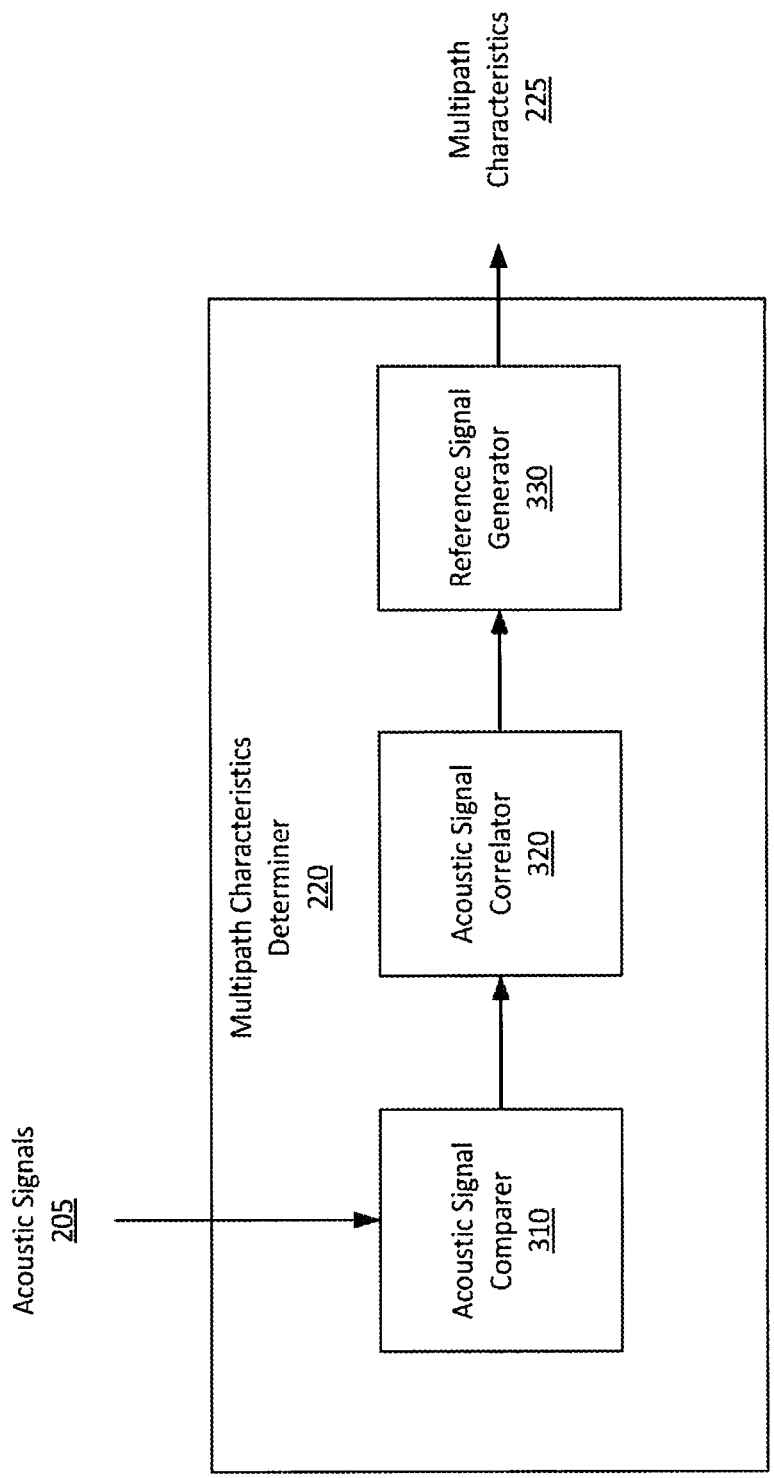
FIG. 3A illustrates a block diagram of an example multipath characteristics determiner of a multipath correction system, according to some embodiments.

FIG. 3A illustrates a block diagram of example multipath characteristics determiner 220 of multipath correction system 200, according to some embodiments. As illustrated in FIG. 3A, multipath characteristics 225 are generated using acoustic signals 205 as input, where acoustic signals 205 includes signals captured at multiple locations of the ultrasonic sensor and at multiple different times of flight.

For example, multipath characteristics determiner 220 and multipath correction determiner 230 identify successive layers of the target (e.g., a finger) to reveal the underlying layers. For example, multipath characteristics 225 are identified and utilized as a reference input (e.g., reference input x(n) of AMC 700 of FIG. 7) for revealing the deeper layers of the target. Acoustic signals 205 are received at acoustic signal comparer 310, where acoustic signals captured at different times of flight are compared. It should be appreciated that acoustic signals can also be referred to as images at different times of flight, where an image includes all acoustic signals received over the ultrasonic sensor at a particular time of flight.

Multipath characteristics determiner 220 identifies multipath characteristics 225 based on acoustic signals 205. For example, through a predetermined window of time (e.g., times of flight) for the ultrasound echo to return, after the initial triggering, a known return time path is scanned for the first signals (e.g., image). It should be appreciated that the first layer contribution can also be determined through the correlation determination. The multipath characteristics 225 that are used (e.g., in AMC 700 as the reference input x(n)) for the correction is based on a correlation investigation of the acoustic signal. The multipath signals may have different time of flight, but if they are multiple reflection of a primary signal they comprise a similar spatial pattern. Thus, this correlation can be used to determine multipath characteristics 225. In one embodiment, a spatial pattern with the highest correlation in the acoustic stream is used as multipath characteristics 225. For example, the first (shallow) layer will present a higher correlation than deeper layers. The correlation determination may be done globally over the complete sensor surface, or may be performed in a number of regions.

For example, acoustic signals 205 are received at acoustic signal comparer 310. The acoustic signals 205 can include those signals within a predetermined time of flight range.

Acoustic signal comparer 310 operates to compare the signals of the time of flight range. The results of the comparison are received at acoustic signal correlator 320 that estimates correlations between a signal or image and any number of other signals or images (e.g., all signals or images).

Figure 5A:
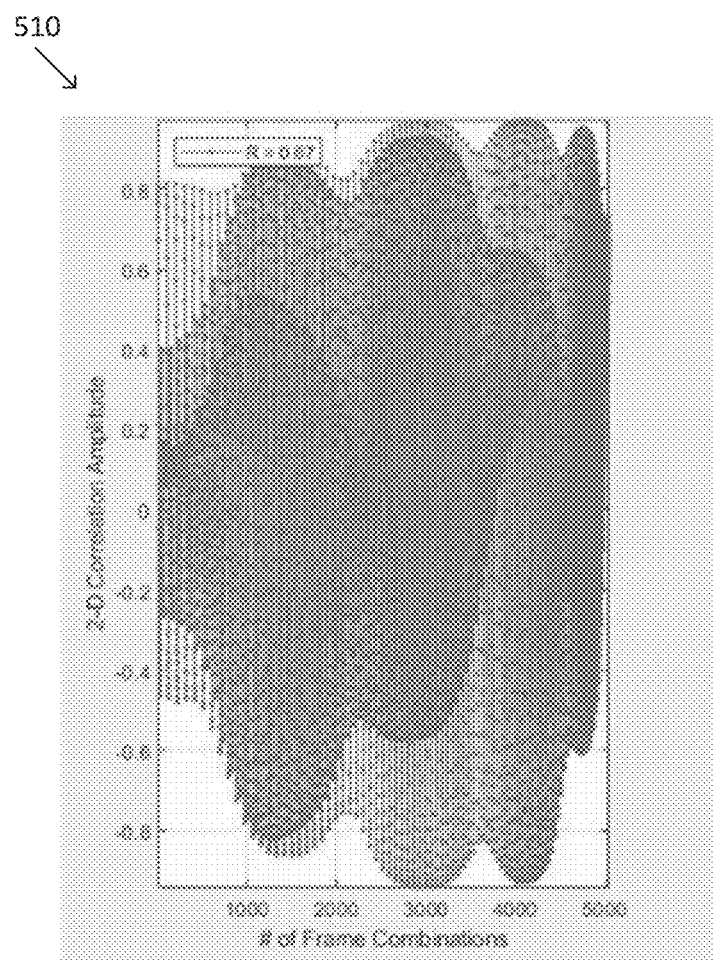
FIG. 5A shows an example plot of signal correlations for multiple signals, according to embodiments.
Figure 5B:
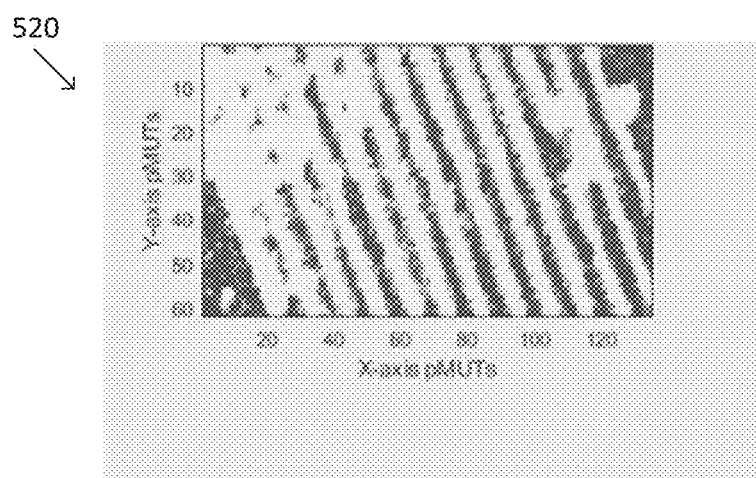
FIG. 5B shows an example reference image based on the signal correlations of the example plot of FIG. 5A, according to embodiments.

FIG. 5A shows an example plot 510 of signal correlations for multiple signals, according to embodiments. Plot 510 illustrates a two-dimensional correlation estimation utilized in selecting a reference image as the multipath characteristics. Plot 510 shows the correlations amplitude on the y-axis and the number of frame combinations on the x-axis. Based on the correlation estimation of plot 510, a reference image is selected (e.g., the image having the highest correlation peak). Plot 510 shows an example of how the comparison of the difference images and determining its correlation coefficient can be done to find the reference multipath signal or image. It should be appreciated that this process can be repeated for each layer, after correction for the previous layer. In this example, the correction is determined on a global sensor level. FIG. 5B shows an example reference image 520 based on the signal correlations of the example plot 510 of FIG. 5A, according to embodiments. In example reference image 520, the target is a multilayer phantom target with overlapping layers of lines at different directions.

With reference to FIG. 3A, when all images in the acoustic stream have been processed, the signal or image that created the highest correlation peak with its successor is selected as a reference signal or image at reference signal generator 330. In some embodiments, this signal or image is labeled as the candidate for the AMC reference input. It should be appreciated that in accordance with other embodiments, the comparison can be performed among and the correlation based on a plurality of signals or images (e.g., successive signals or images).

Having identified the first candidate acoustic image for utilization as the multipath characteristics 225, multipath characteristics 225 are received at multipath correction determiner 230 for comparison to acoustic signals 205.

Figure 3B:
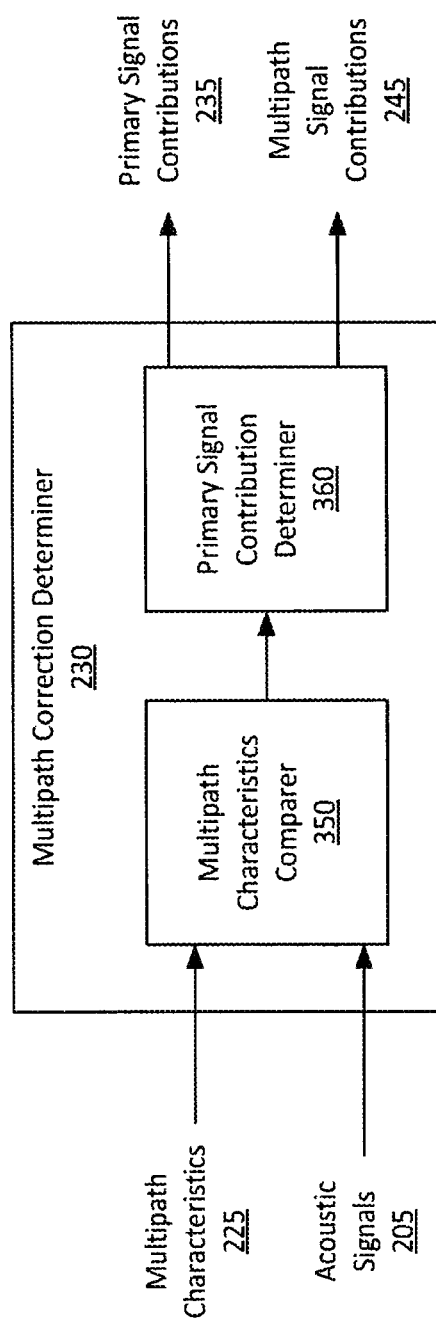
FIG. 3B illustrates a block diagram of an example multipath correction determiner of a multipath correction system, according to some embodiments.

FIG. 3B illustrates a block diagram of example multipath correction determiner 230 of multipath correction system 200, according to some embodiments. Multipath characteristics comparer 350 receives acoustic signals 205 and multipath characteristics 225 (e.g., a reference signal or reference image). Multipath characteristics comparer 350 compares acoustic signals 205 to multipath characteristics 225.

Primary signal contribution determiner 360 receives the comparison of acoustic signals 205 to multipath characteristics 225 from multipath characteristics comparer 350 and determines primary signal contributions 235 of acoustic signals 205. In some embodiments, multipath characteristics comparer 350 also determines multipath signal contributions 245 of acoustic signals 205.

Figure 6:
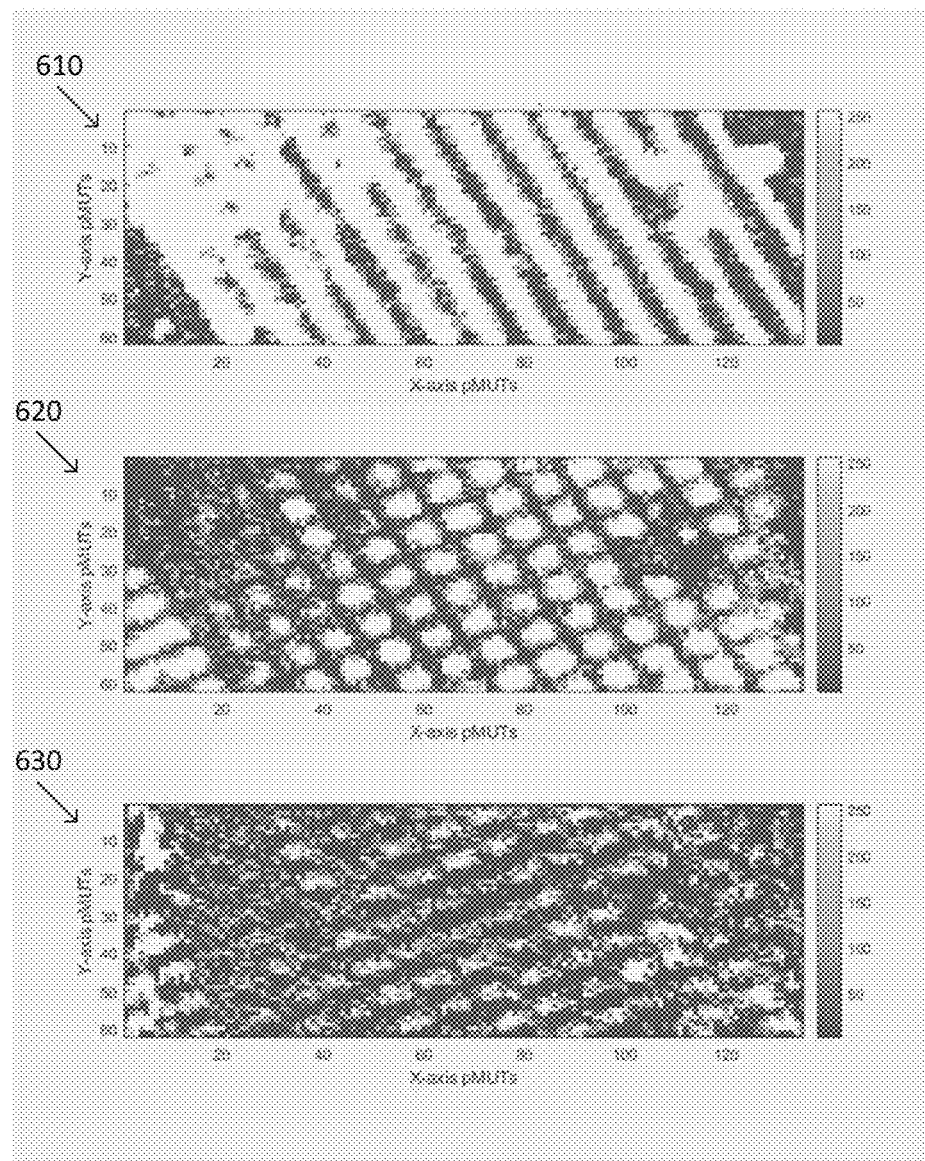
FIG. 6 shows example images used in acoustic multipath correction to extract deeper layers of a target, according to embodiments.

FIG. 6 shows example images used in acoustic multipath correction to extract deeper layers of a target from a stream of acoustic signals or images, according to embodiments. In the illustrated embodiments, the target is a multilayer phantom target with overlapping layers of lines at different directions. It should be appreciated that the target can be a finger having multiple dermal layers or a phantom finger (with or without multiple layers).

Image 610 is an example reference image (e.g., multipath characteristics) identified by the above described processes. Image 620 is an example image of the full acoustic stream (e.g., the primary input of AMC 700 of FIG. 7). Image 620 illustrates a from showing two overlapped targets with only the intersections clearly defined prior to removal of the reference image 610.

Image 630 shows the residual output post cancellation of the reference image 610 from image 620 of the acoustic stream. For this particular image, it seen that the first layer of the target has been completely removed and the residual is image 630 (the second layer of the target), showing better features post multipath correction processing.

Figure 7:
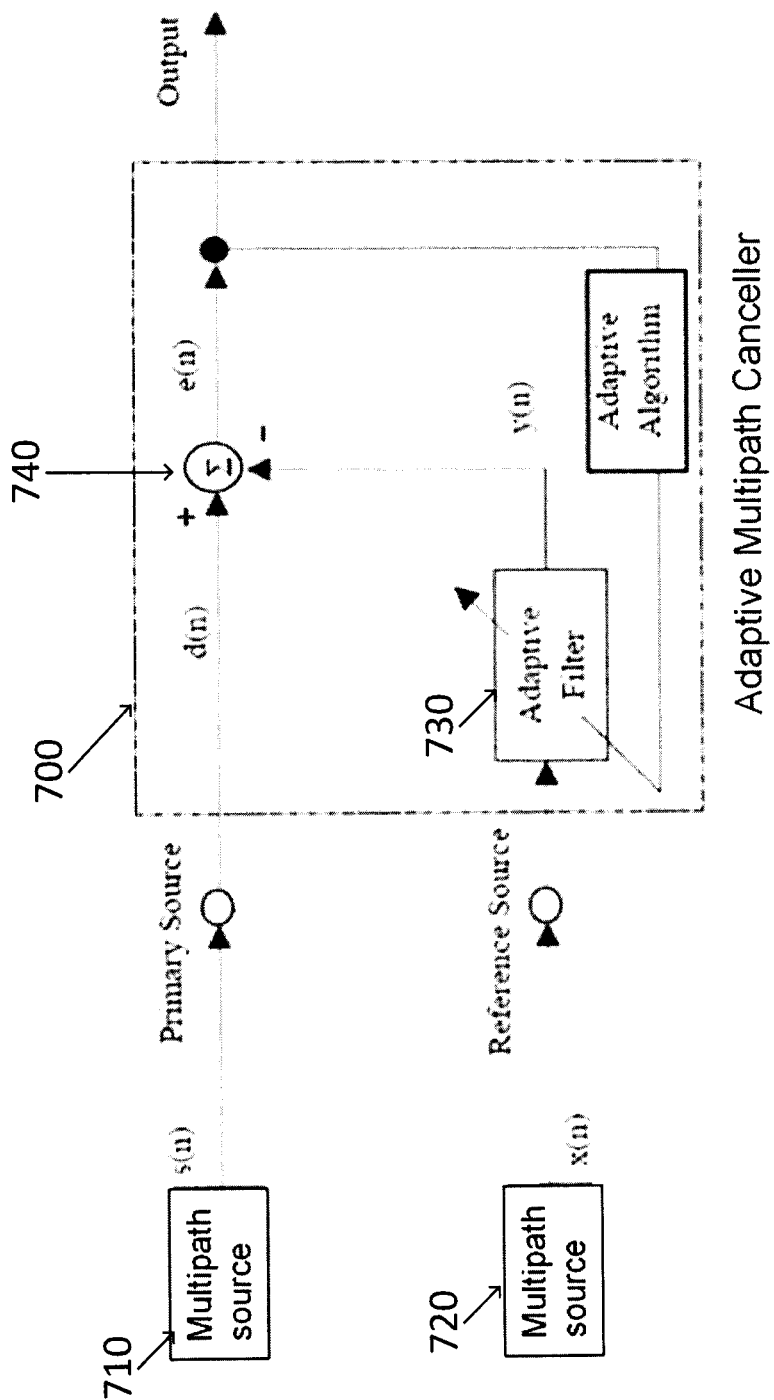
FIG. 7 illustrates a block diagram of an example acoustic multipath canceller (AMC), upon which principles of the described embodiments can be implemented.

FIG. 7 shows an example embodiment of the multipath cancellation principle as implemented by an acoustic multipath canceller (AMC) 700. As illustrated, AMC 700 has two inputs: primary input d(n) and reference input x(n), where primary input d(n) receives a signal s(n) from the multipath source 710 (e.g., an acoustic signal) that is corrupted by the presence of noise n uncorrelated with the acoustic signal of multipath source 710.

The reference input x(n) from multipath source 720 receives a multipath signal $n_0$ uncorrelated with the signal s(n) but correlated in some way with the multipath signal $n_0$. The multipath signal $n_0$ passes through a filter 730 to produce an output y(n) that is a close estimate of primary input multipath signal. This multipath signal estimate y(n) is subtracted from the corrupted signal d(n) (e.g., an acoustic signal including multipath reflections) at adder 740 to produce an estimate of the signal at e(n), the system output after multipath correction.

The practical objective is to produce a system output e(n)=d(n)−y(n) that is a best fit in the least squares sense (LMS) to the signal s(n). This objective is accomplished by feeding the system output back to the adaptive filter and adjusting the filter through an LMS adaptive algorithm to minimize total system output power (e.g., the system output serves as the error signal for the adaptive process). Other methods of fitting and adaptive correction may also be used without deviating from the invention. An example LMS adaptive algorithm for updating weight of adaptive filter 730 is:

$$w(n+1)=w(n)+2\mu e(n)x(n)$$

where x(n) is the input vector of time delayed input values:

$$x(n)=[x(n)x(n-1)x(n-2) \ldots x(n-N+1)]^{\tau}$$

where w(n) represents the coefficients of the adaptive FIR filter tap weight vector at time n, and where μ is the known step size. If μ is too small, convergence on the solution will be too long and if μ is too large, adaptive filter 730 becomes unstable and the output diverges.

Figure 8:
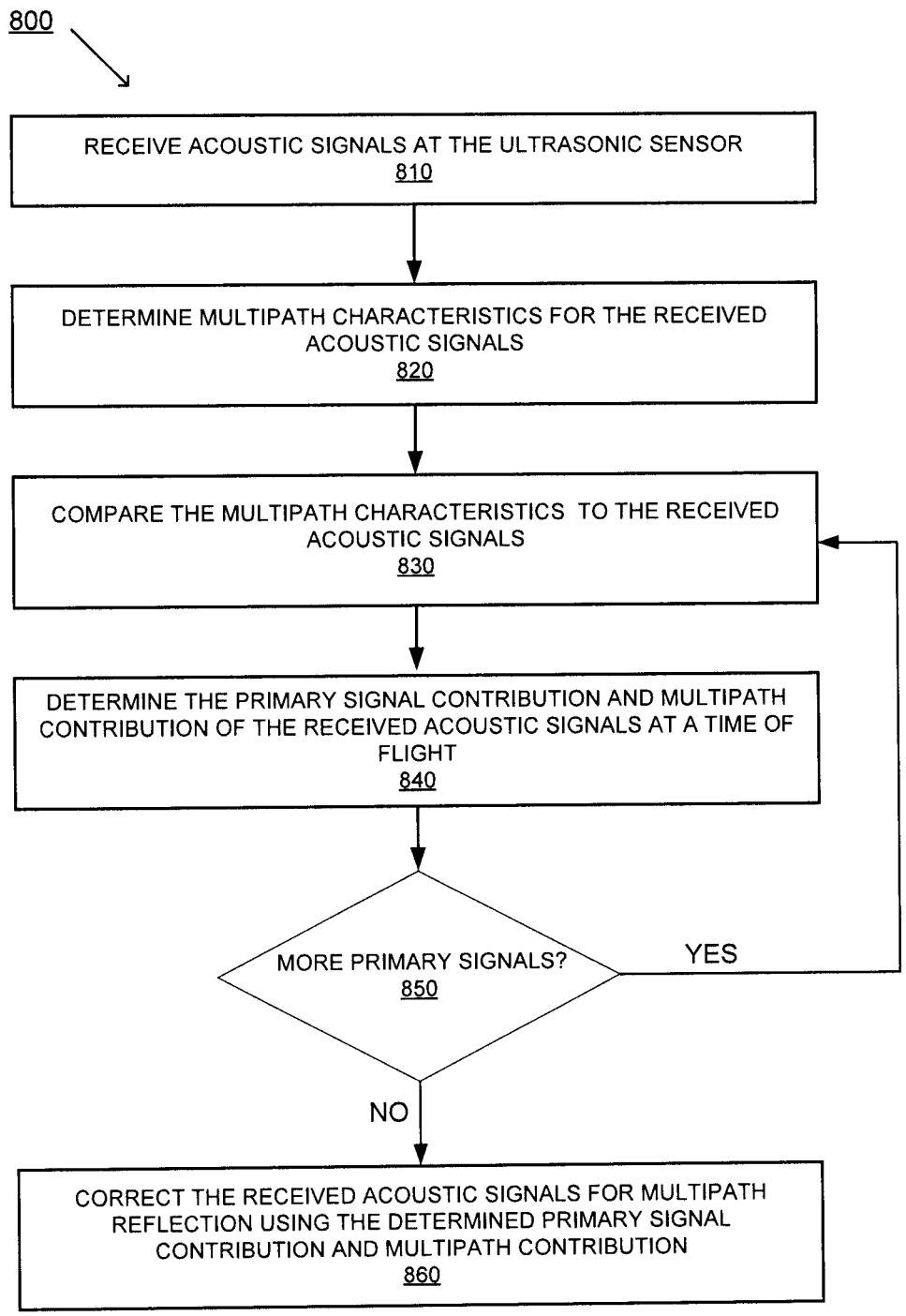
FIG. 8 illustrates an example flow diagram for multipath reflection correction of acoustic signals received at an ultrasonic sensor, according to some embodiments
Figure 9:
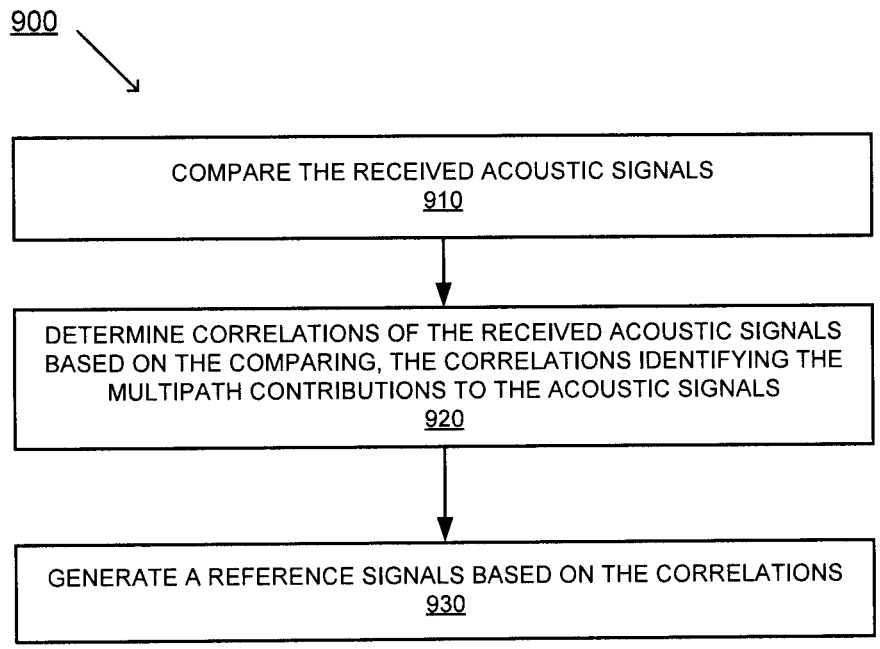
FIG. 9 illustrates an example flow diagram for determining the characteristics of multipath reflection signals of the ultrasonic sensor, according to embodiments
Figure 10:
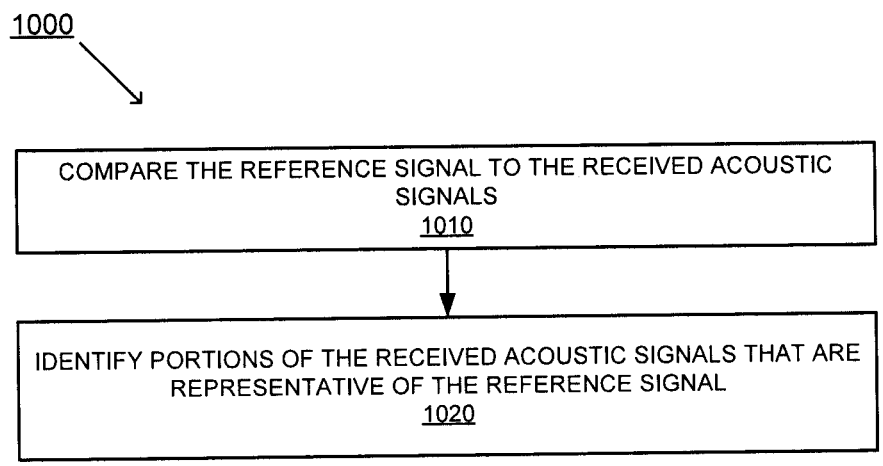
FIG. 10 illustrates an example flow diagram for comparing the characteristics of multipath reflection signals to the received acoustic signals, according to embodiments.

Example Operations for Multipath Reflection Correction of Acoustic Signals Received at an Ultrasonic Sensor FIGS. 8 through 10 illustrate example processes for multipath reflection correction of acoustic signals received at an ultrasonic sensor, according to some embodiments. Procedures of the example processes will be described with reference to elements and/or components of various figures described herein. It is appreciated that in some embodiments, the procedures may be performed in a different order than described, that some of the described procedures may not be performed, and/or that one or more additional procedures to those described may be performed. The flow diagrams include some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software.

FIG. 8 illustrates an example flow diagram 800 for multipath reflection correction of acoustic signals received at an ultrasonic sensor, according to some embodiments. At procedure 810 of flow diagram 800, acoustic signals are received at the ultrasonic sensor over a time of flight range while a target is interacting with the ultrasonic sensor, wherein the acoustic signals comprise a primary signal contribution and a multipath reflection signal contribution.

At procedure 820, characteristics of multipath reflection signals of received acoustic signals are determined, wherein the characteristics of the multipath reflection signals of the received acoustic signals comprise a relationship of primary signal contributions to multipath reflection signal contributions for the acoustic signals received at the ultrasonic sensor at a plurality of times of flight for a plurality of locations of the ultrasonic sensor. In some embodiments, the characteristics of the multipath reflection signals of received acoustic signals are based on correlations within the received acoustic signals identifying the multipath reflection signal contributions of the received acoustic signals.

In some embodiments, procedure 820 can be performed according to FIG. 9. FIG. 9 illustrates an example flow diagram 900 for determining the characteristics of multipath reflection signals of the ultrasonic sensor, according to embodiments. At procedure 910 of flow diagram 900, the received acoustic signals are compared at the plurality of times of flight for the plurality of locations. At procedure 920, based on the comparing, the correlations to identify the multipath reflection signal contributions of the received acoustic signals at the plurality of times of flight for the plurality of locations are determined, wherein the correlations are the characteristics of the multipath reflection signals. In one embodiment, as shown at procedure 930, a reference signal based on the correlations identifying the multipath reflection signal contributions of the received acoustic signals is generated, wherein the characteristics of the multipath reflection signals of received acoustic signals comprise the reference signal.

With reference to FIG. 8, at procedure 830, the characteristics of the multipath reflection signals of received acoustic signals are compared to the received acoustic signals. In some embodiments, procedure 830 can be performed according to FIG. 10. FIG. 10 illustrates an example flow diagram 1000 for comparing the characteristics of multipath reflection signals to the received acoustic signals, according to embodiments. At procedure 1010 of flow diagram 1000, the reference signal is compared to the received acoustic signals at the plurality of times of flight. At procedure 1020, portions of the received acoustic signals that are representative of the reference signal are identified based on the comparing the reference signal to the received acoustic signals at the plurality of times of flight, wherein the portions of the received acoustic signals that are representative of the reference signal comprise the multipath reflection signal contributions of the received acoustic signals.

With reference to FIG. 8, at procedure 840, the primary signal contribution and the multipath reflection signal contribution of the received acoustic signals is determined at a time of flight of the time range based on the characteristics of the multipath reflection signals of received acoustic signals. In some embodiments, the portions of the received acoustic signals that are representative of the reference signal are removed from the acoustic signals based on the comparing the reference signal to the received acoustic signals, wherein remaining acoustic signals comprises a first primary signal contribution (e.g., a signal at a deeper layer of the target.

At procedure 850, it is determined whether there are more primary signals to identify. Provided there are not more primary signals to identify, flow diagram 800 proceeds to procedure 860. At procedure 860, the received acoustic signals are corrected for multipath reflection using the determined primary signal contribution and multipath signal contribution. Provided there are more primary signals to identify, flow diagram 800 returns to procedure 830 using the next primary signal.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for multipath reflection correction of acoustic signals received at an ultrasonic sensor, the method comprising:

receiving acoustic signals at the ultrasonic sensor over a time of flight range, wherein the acoustic signals comprise a primary signal contribution and a multipath reflection signal contribution;

determining characteristics of multipath reflection signals of received acoustic signals, wherein the characteristics of the multipath reflection signals of the received acoustic signals comprise a relationship of primary signal contributions to multipath reflection signal contributions for the acoustic signals received at the ultrasonic sensor at a plurality of times of flight for a plurality of locations of the ultrasonic sensor, and wherein the characteristics of the multipath reflection signals of received acoustic signals are based on correlations within the received acoustic signals identifying the multipath reflection signal contributions of the received acoustic signals;

comparing the characteristics of the multipath reflection signals of received acoustic signals to the received acoustic signals; and determining the primary signal contribution and the multipath reflection signal contribution of the received acoustic signals at a plurality of times of flight of the time range based on the characteristics of the multipath reflection signals of received acoustic signals, wherein the primary signal contribution comprises the received acoustic signals corrected for the multipath reflection signals.

2. The method of claim 1, wherein the determining the characteristics of the multipath reflection signals of received acoustic signals comprises:

comparing the received acoustic signals at the plurality of times of flight for the plurality of locations; and based on the comparing, determining the correlations to identify the multipath reflection signal contributions of the received acoustic signals at the plurality of times of flight for the plurality of locations, wherein the correlations are the characteristics of the multipath reflection signals.

3. The method of claim 2, wherein the determining the characteristics of the multipath reflection signals of received acoustic signals further comprises:

generating a reference signal based on the correlations identifying the multipath reflection signal contributions of the received acoustic signals, wherein the characteristics of the multipath reflection signals of received acoustic signals comprise the reference signal.

4. The method of claim 3, wherein the comparing the characteristics of the multipath reflection signals of received acoustic signals to the received acoustic signals comprises:

comparing the reference signal to the received acoustic signals at the plurality of times of flight; and based on the comparing the reference signal to the received acoustic signals at the plurality of times of flight, identifying portions of the received acoustic signals that are representative of the reference signal, wherein the portions of the received acoustic signals that are representative of the reference signal comprise the multipath reflection signal contributions of the received acoustic signals.

5. The method of claim 4, wherein the determining the primary signal contribution and the multipath reflection signal contribution of the received acoustic signals at the plurality of times of flight of the time range based on the characteristics of the multipath reflection signals of received acoustic signals comprises:

based on the comparing the reference signal to the received acoustic signals, removing the portions of the received acoustic signals that are representative of the reference signal from the acoustic signals, wherein remaining acoustic signals comprises a first primary signal contribution.

6. The method of claim 5, wherein the determining the characteristics of the multipath reflection signals of received acoustic signals comprises:

comparing the remaining acoustic signals at the plurality of times of flight for the plurality of locations; and based on the comparing, determining second correlations to identify second multipath reflection signal contributions of the remaining acoustic signals at the plurality of times of flight for the plurality of locations, wherein the second correlations are the characteristics of the multipath reflection signals.

7. The method of claim 6, wherein the determining the characteristics of the multipath reflection signals of received acoustic signals further comprises:

generating a second reference signal based on the second correlations identifying the second multipath reflection signal contributions of the remaining acoustic signals, wherein the characteristics of the multipath reflection signals of received acoustic signals comprise the second reference signal.

8. The method of claim 7, wherein the comparing the characteristics of the multipath reflection signals of received acoustic signals to the received acoustic signals comprises:
comparing the second reference signal to the remaining acoustic signals at the plurality of times of flight; and
based on the comparing the second reference signal to the remaining acoustic signals at the plurality of times of flight, identifying second portions of the remaining acoustic signals that are representative of the second reference signal, wherein the second portions of the remaining acoustic signals that are representative of the second reference signal comprise the second multipath reflection signal contributions of the remaining acoustic signals.

9. The method of claim 8, wherein the determining the primary signal contribution of the received acoustic signals at the plurality of times of flight of the time range based on the characteristics of the multipath reflection signals of received acoustic signals comprises:
based on the comparing the second reference signal to the remaining acoustic signals, removing the second portions of the remaining acoustic signals that are representative of the second reference signal from the remaining acoustic signals, wherein second remaining acoustic signals comprises a second primary signal contribution.

10. The method of claim 1, further comprising:
correcting the received acoustic signals to isolate the primary signal contribution by removing the multipath reflection signal contributions from the received acoustic signals.

11. The method of claim 1, wherein the method is implemented within an adaptive filter configured to receive the acoustic signals and iteratively identify the multipath reflection signal contributions of the received acoustic signals.

12. An ultrasonic sensor device comprising:
a plurality of ultrasonic transducers; and
a processor, wherein the processor is configured to:
receive acoustic signals at the ultrasonic sensor over a time of flight range, wherein the acoustic signals comprise a primary signal contribution and a multipath reflection signal contribution;
determine characteristics of multipath reflection signals of received acoustic signals, wherein the characteristics of the multipath reflection signals of the received acoustic signals comprise a relationship of primary signal contributions to multipath reflection signal contributions for the acoustic signals received at the ultrasonic sensor at a plurality of times of flight for a plurality of locations of the ultrasonic sensor, and wherein the characteristics of the multipath reflection signals of received acoustic signals are based on correlations within the received acoustic signals identifying the multipath reflection signal contributions of the received acoustic signals;
compare the characteristics of the multipath reflection signals of received acoustic signals to the received acoustic signals; and
determine the primary signal contribution and the multipath reflection signal contribution of the received acoustic signals at a plurality of times of flight of the time range based on the characteristics of the multipath reflection signals of received acoustic signals, wherein the primary signal contribution comprises the received acoustic signals corrected for the multipath reflection signals.

13. The ultrasonic sensor device of claim 12, wherein the processor is further configured to:
compare the received acoustic signals at the plurality of times of flight for the plurality of locations; and
determine the correlations to identify the multipath reflection signal contributions of the received acoustic signals at the plurality of times of flight for the plurality of locations based on the compare of the received acoustic signals at the plurality of times of flight for the plurality of locations, wherein the correlations are the characteristics of the multipath reflection signals.

14. The ultrasonic sensor device of claim 13, wherein the processor is further configured to:
generate a reference signal based on the correlations identifying the multipath reflection signal contributions of the received acoustic signals, wherein the characteristics of the multipath reflection signals of received acoustic signals comprise the reference signal.

15. The ultrasonic sensor device of claim 14, wherein the processor is further configured to:
compare the reference signal to the received acoustic signals at the plurality of times of flight; and
identifying portions of the received acoustic signals that are representative of the reference signal based on the compare of the reference signal to the received acoustic signals at the plurality of times of flight, wherein the portions of the received acoustic signals that are representative of the reference signal comprise the multipath reflection signal contributions of the received acoustic signals.

16. The ultrasonic sensor device of claim 15, wherein the processor is further configured to:
remove the portions of the received acoustic signals that are representative of the reference signal from the acoustic signals based on the compare of the reference signal to the received acoustic signals, wherein remaining acoustic signals comprises a first primary signal contribution.

17. The ultrasonic sensor device of claim 16, wherein the processor is further configured to:
compare the remaining acoustic signals at the plurality of times of flight for the plurality of locations; and
determine second correlations to identify second multipath reflection signal contributions of the remaining acoustic signals at the plurality of times of flight for the plurality of locations based on the compare of the remaining acoustic signals at the plurality of times of flight for the plurality of locations, wherein the second correlations are the characteristics of the multipath reflection signals.

18. A non-transitory computer readable storage medium having computer readable program code stored thereon for causing a computer system to perform a method for multipath reflection correction of acoustic signals received at an ultrasonic sensor, the method comprising:
receiving acoustic signals at the ultrasonic sensor over a time of flight range, wherein the acoustic signals comprise a primary signal contribution and a multipath reflection signal contribution;
determining characteristics of multipath reflection signals of received acoustic signals, wherein the characteristics of the multipath reflection signals of the received acoustic signals comprise a relationship of primary signal contributions to multipath reflection signal contributions for the acoustic signals received at the ultrasonic sensor at a plurality of times of flight for a plurality of locations of the ultrasonic sensor, and wherein the characteristics of the multipath reflection signals of received acoustic signals are based on correlations within the received acoustic signals identifying the multipath reflection signal contributions of the received acoustic signals;

comparing the characteristics of the multipath reflection signals of received acoustic signals to the received acoustic signals; and determining the primary signal contribution and the multipath reflection signal contribution of the received acoustic signals at a plurality of times of flight of the time range based on the characteristics of the multipath reflection signals of received acoustic signals, wherein the primary signal contribution comprises the received acoustic signals corrected for the multipath reflection signals.

19. The method of claim 1, wherein the characteristics of multipath reflection signals comprises a received acoustic signal of the received acoustic signals exhibiting a spatial pattern with a highest correlation of the received acoustic signals.

* * * * *